United States Patent
Bordegnoni et al.

(10) Patent No.: US 10,245,729 B2
(45) Date of Patent: *Apr. 2, 2019

(54) SENSORIZED COVERING FOR AN INDUSTRIAL DEVICE

(71) Applicant: Comau S.p.A., Grugliasco (IT)

(72) Inventors: Stefano Bordegnoni, Grugliasco (IT); Francesco Ciniello, Grugliasco (IT); Giuseppe Colombina, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/596,768

(22) Filed: May 16, 2017

(65) Prior Publication Data

US 2017/0334070 A1 Nov. 23, 2017

(30) Foreign Application Priority Data

May 17, 2016 (IT) .............. 102016050672

(51) Int. Cl.
| | |
|---|---|
| *B25J 9/16* | (2006.01) |
| *G01L 1/18* | (2006.01) |
| *B25J 19/06* | (2006.01) |
| *B25J 13/08* | (2006.01) |
| *G01B 7/14* | (2006.01) |
| *B25J 19/00* | (2006.01) |
| *B25J 19/02* | (2006.01) |

(52) U.S. Cl.
CPC .......... *B25J 9/1676* (2013.01); *B25J 13/084* (2013.01); *B25J 13/086* (2013.01); *B25J 19/0075* (2013.01); *B25J 19/0091* (2013.01); *B25J 19/028* (2013.01); *B25J 19/063* (2013.01); *B25J 19/065* (2013.01); *G01B 7/14* (2013.01); *G01L 1/18* (2013.01); *G05B 2219/40201* (2013.01); *G05B 2219/40202* (2013.01)

(58) Field of Classification Search
CPC .... B25J 9/1676; B25J 13/086; B25J 19/0075; B25J 19/0091; B25J 19/028; B25J 19/063; B25J 19/065; G01L 1/18; G01B 7/14
USPC ........................................................ 174/520
See application file for complete search history.

(56) References Cited

U.S. PATENT DOCUMENTS

| | | | |
|---|---|---|---|
| 9,272,415 B2 * | 3/2016 | Nogami ................. | B25J 19/063 |
| 2003/0137219 A1 | 7/2003 | Heiligensetzer et al. | |

(Continued)

FOREIGN PATENT DOCUMENTS

| | | |
|---|---|---|
| JP | S63238502 A | 10/1988 |
| JP | 2010010116 A | 1/2010 |

*Primary Examiner* — Timothy J Thompson
*Assistant Examiner* — Charles Pizzuto
(74) *Attorney, Agent, or Firm* — Young Basile Hanlon & MacFarlane, P.C.

(57) ABSTRACT

A sensorized covering, prearranged for covering at least part of a movable structure of an automated device. The sensorized covering is useful for sensing an actual impact or anticipating an imminent impact to the automated device. The sensorized covering includes one or more covering modules wherein each covering module may include contact sensors and/or proximity sensors, a loading bearing structure and/or controls. The individual sensorized modules may be independently connected or controlled, or connected together and collectively controlled. Examples of the automated device my include a movable robots or an automated guided vehicles (AGVs).

20 Claims, 16 Drawing Sheets

(56) References Cited

U.S. PATENT DOCUMENTS

| | | | |
|---|---|---|---|
| 2011/0307097 A1* | 12/2011 | Colledani | G01D 5/16 |
| | | | 700/255 |
| 2016/0089779 A1* | 3/2016 | Hahakura | B25J 9/046 |
| | | | 74/490.02 |
| 2017/0334076 A1* | 11/2017 | Bordegnoni | B25J 19/065 |

* cited by examiner

SENSORIZED COVERING FOR AN INDUSTRIAL DEVICE

FIELD OF INVENTION

The present invention relates to automated devices used in the sector of industrial production and has been developed with particular reference to the issue of co-operation between a human operator and such an automated device. The invention finds preferred application in the field of robotics, but can be implemented to advantage also on other devices used in the industrial-production sector.

BACKGROUND

In order to exploit effectively the contribution of automation in production processes and thereby increase the efficiency of the latter, it is necessary to render interaction between human operators and automated devices, in particular robots, natural and safe. In this way, human operators can be entrusted with those processes that would require an excessively complex automation, whereas the operations that involve, for example, major effort, rapidity of execution, high precision, and quality can be entrusted to automated devices.

To render these production modalities possible, solutions are required that render human interaction with the automated devices natural and safe. The approaches currently adopted for this purpose are basically linked to the issues of passive safety and active safety.

With specific reference to industrial robots, the methodologies linked to the increase of passive safety in the interaction between a human operator and the manipulator of a robot are basically aimed at modifying the structure and operation of the latter, in order to reduce the likelihood of accidents and the degree of seriousness thereof. According to this approach, robot manipulators have for example been proposed that are distinguished by light structures, coated with soft materials and without sharp edges or corners in order to minimize the harm caused by possible impact against a human operator.

The methodologies linked to the increase in active safety regard, instead, control strategies based upon a dedicated sensor system, aimed at guaranteeing a constant monitoring of the environment that surrounds the manipulator of the robot, in order to modify in a dynamic way its behavior in the case of potentially risky situations, such as approach of a human operator to the manipulator or contact between the operator and the manipulator during execution of a given function. The types of sensors currently used for this purpose are basically the following:
  sensors aimed at optical reconstruction of the geometry of the environment surrounding the manipulator, such as video cameras and laser scanners;
  electrical sensors aimed at recognizing contact or collision between the manipulator and a human operator, such as force sensors or contact sensors;
  electrical sensors aimed at recognizing the excessive approach between the manipulator and a human operator, such as proximity sensors.

Robots have been proposed in which the two strategies of passive safety and active safety are integrated in a sensorized covering or coating of the corresponding manipulator. These coverings are in general constituted by a sort of "skin", prevalently made of elastically yielding material, that embraces a corresponding part of the manipulator and integrates contact sensors and/or proximity sensors.

Installation of these known coverings on the movable structure of the manipulator is in general complicated and far from practical. Also the corresponding operation of removal or replacement of the covering or of parts thereof in the case of occasional failures proves laborious.

Similar problems are encountered also in automated devices with movable parts other than robots, used in the context of an industrial production.

SUMMARY

The present invention basically aims to provide a sensorized covering for an automated industrial device, in particular a robot, which is immune from the aforesaid drawbacks, albeit ensuring a high degree of co-operation between the device and a human operator, at the same time ensuring the necessary safety requirements.

This and further aims still, which will emerge clearly hereinafter, are achieved according to the present invention by a sensorized covering for an automated industrial device and by an industrial device having the characteristics specified in the attached claims.

The claims form an integral part of the technical teaching provided herein in relation to the invention.

BRIEF DESCRIPTION OF THE DRAWINGS

Further aims, characteristics and advantages of the present invention will emerge clearly from the ensuing description and from the annexed drawings, which are provided purely by way of explanatory and non-limiting example in which.

DETAILED DESCRIPTION

Reference to "an embodiment" or "one embodiment" in the framework of the present disclosure is intended to indicate that a particular configuration, structure, or characteristic described in relation to the embodiment is comprised in at least one embodiment. Hence, characteristics described with reference to "an embodiment", "at least one embodiment", "one or more embodiments" and the like, that may be present in various parts in this description, do not necessarily all refer to one and the same embodiment. Moreover, the particular configurations, structures, or characteristics may be combined in any adequate way in one or more embodiments. The references used in what follows are provided only for convenience and do not define the sphere of protection or the scope of the embodiments.

It is moreover pointed out that, in the sequel of the present description, the automated devices in relation to which possible embodiments of the invention are exemplified will be described limitedly to the elements useful for an understanding of the invention.

Figure 1:
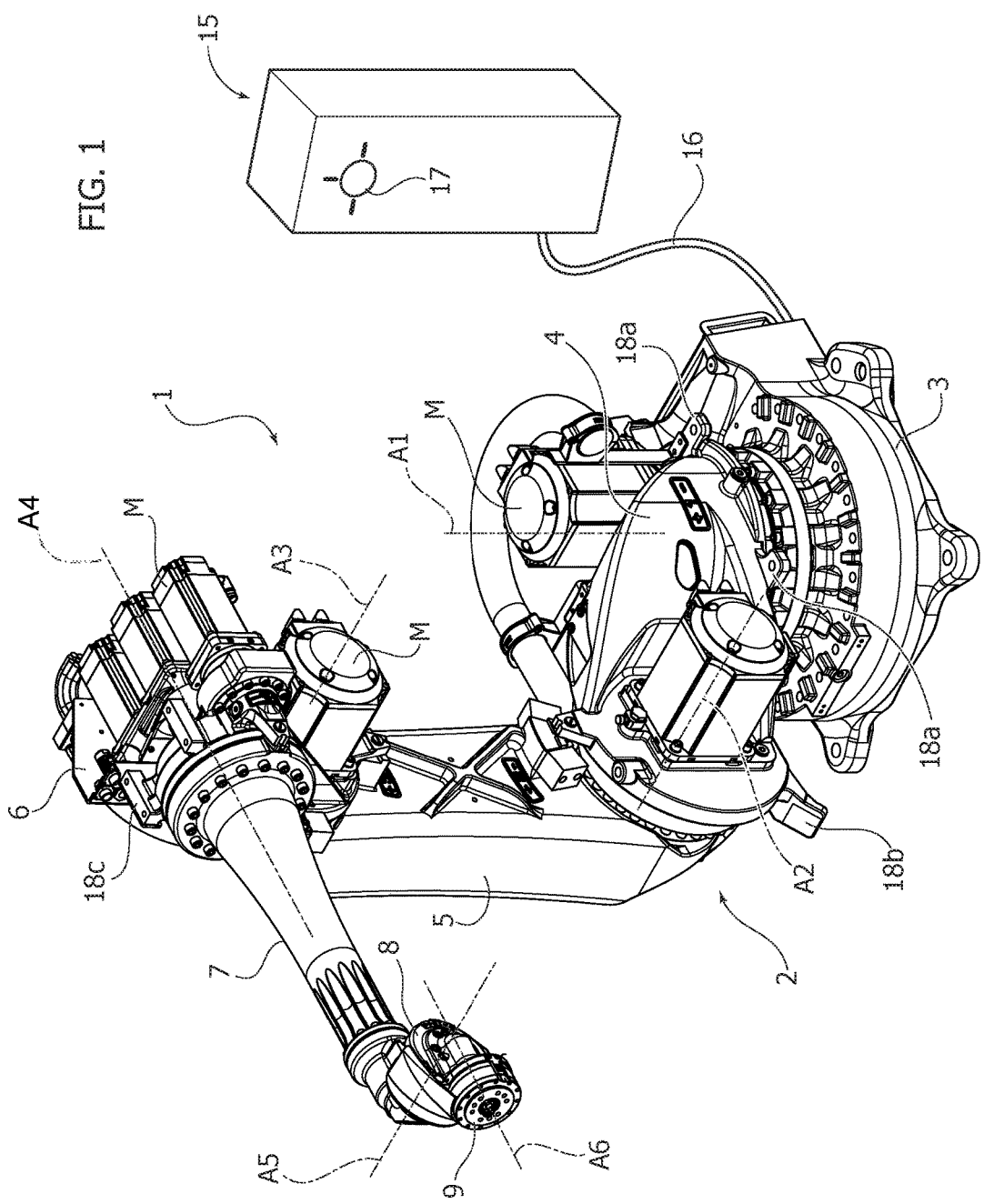
FIG. 1 is a partial and schematic perspective view of an automated device according to possible embodiments of the invention.

FIG. 1 is a schematic representation of an automated device for use in an industrial production, according to possible embodiments of the invention. In the example illustrated, the device is a robot, which comprises a manipulator 1 with a number of degrees of freedom, having a movable structure 2 that includes a plurality of parts connected together, as well as actuator means that can be controlled for causing displacements of these parts of the structure 2.

In the example illustrated, the robot is an anthropomorphic robot with six degrees of freedom, having a stationary base 3 and a column 4 rotatably mounted on the base 3 about a first axis A1 with vertical orientation. Designated by 5 is an arm mounted oscillating on the column 4 about a second axis A2 with horizontal orientation. Designated by 6 is an elbow, mounted on the arm 5 for turning about a third axis A3, which has also a horizontal orientation, the elbow 6 supporting a forearm 7, which is designed to turn about its axis A4, which consequently constitutes a fourth axis of movement of the manipulator 1. The forearm 7 is equipped at its end with a wrist 8, mounted for movement according to two axes A5 and A6. The wrist 8 has a flange 9 for installation of an end effector (not represented). The end effector may be a device for picking up a generic component, for example of the type illustrated in FIG. 12, or else a polishing or grinding device, for example of the type represented in FIG. 14. The aforesaid end effector may in any case be of any type and have any function known in the field; for example, it may be a welding torch or yoke, a paint-spray gun or a gun for applying a sealant, a drilling spindle, etc.

The movable parts 4-8 are connected together by means of joints of a known type, having associated thereto respective electric motors, some of which are designated by M, with corresponding geared motor-reducer transmission. In one or more embodiments, also the end effector associated to the flange 9 has respective actuator means, according to a technique in itself known. Preferentially associated to the aforesaid joints, or to the corresponding motors M, are corresponding transducers (not shown), for example of an encoder or resolver type, for position control.

The movements of the manipulator 1, i.e., operation of the motors of the joints, are managed by a control unit 15 of the robot, which is preferentially located in a remote position with respect to the manipulator 1 and is connected to the electrical/electronic parts of the latter via the conductors of a wiring 16. The practical modes of implementation of the hardware and of software for the unit 15, which is provided with a respective microprocessor control system, do not fall within the purposes of the present description, apart from some specific functions referred to hereinafter, which pertain to possible embodiments of the invention.

In one or more embodiments, the control unit 15 is configured for controlling the manipulator 1 in a plurality of different operating modes, amongst which at least an automatic operating mode and preferably also a manual operating mode. For this purpose, the unit 15 comprises selection means 17, which can be operated by a user for selection of a desired operating mode from the possible ones. In at least one embodiment, the robot is able to operate at least in a Programming Mode, an Automatic Mode, and preferably a Remote Mode. In FIG. 1, the reference number 17 then designates a device for manual selection of the desired operating mode from the possible ones. In the Programming Mode an operator acts in the vicinity of the manipulator, for controlling operation thereof, storing the program steps, and programming the operating activities, for example by means of a portable programming device (teach pendant) or a manual guide device associated to the movable structure of the manipulator 1, in particular at, or in the vicinity of, its end effector. Instead, in the Automatic Mode, the robot executes a pre-stored operating program of its own, possibly in combination with some other robots or automatic equipment, and co-operating with a human operator for the purposes of execution of a specific task. Also in the Remote Mode, the robot executes an operating program of its own inside a work cell, possibly co-operating with a human operator, but in this case start of execution of the program comes from a cell supervisor, such as a PLC, which, for example, controls both the robot and other automated equipment present in the cell itself.

FIG. 1 is a schematic illustration of the manipulator 1 in a "naked" version thereof in order to clarify a possible conformation of its movable structure 4-8. However, in practical embodiments of the invention, this movable structure is covered at least in part by a sensorized covering (visible in FIGS. 2 and 3), where it is designated as a whole by 20. In one or more embodiments, such as the one represented, the covering 20 covers at least in part also the stationary structure of the manipulator 1, here represented by its base 3.

The covering 20 integrates sensor means, which may include contact sensor means, suitable for detecting contact or impact between the manipulator 1 and a foreign body, and/or proximity sensor means, suitable for detecting the presence of a foreign body within a substantially pre-set distance from the manipulator, for example comprised between 0 and 15-20 cm. In various preferred embodiments, the covering 20 integrates both the contact sensor means and the proximity sensor means. Given that, in its preferred applications, the robot is a robot of a collaborative type, the aforesaid foreign body is typically represented by a human operator, which operates in strict contact with the manipulator 1.

Figure 2:
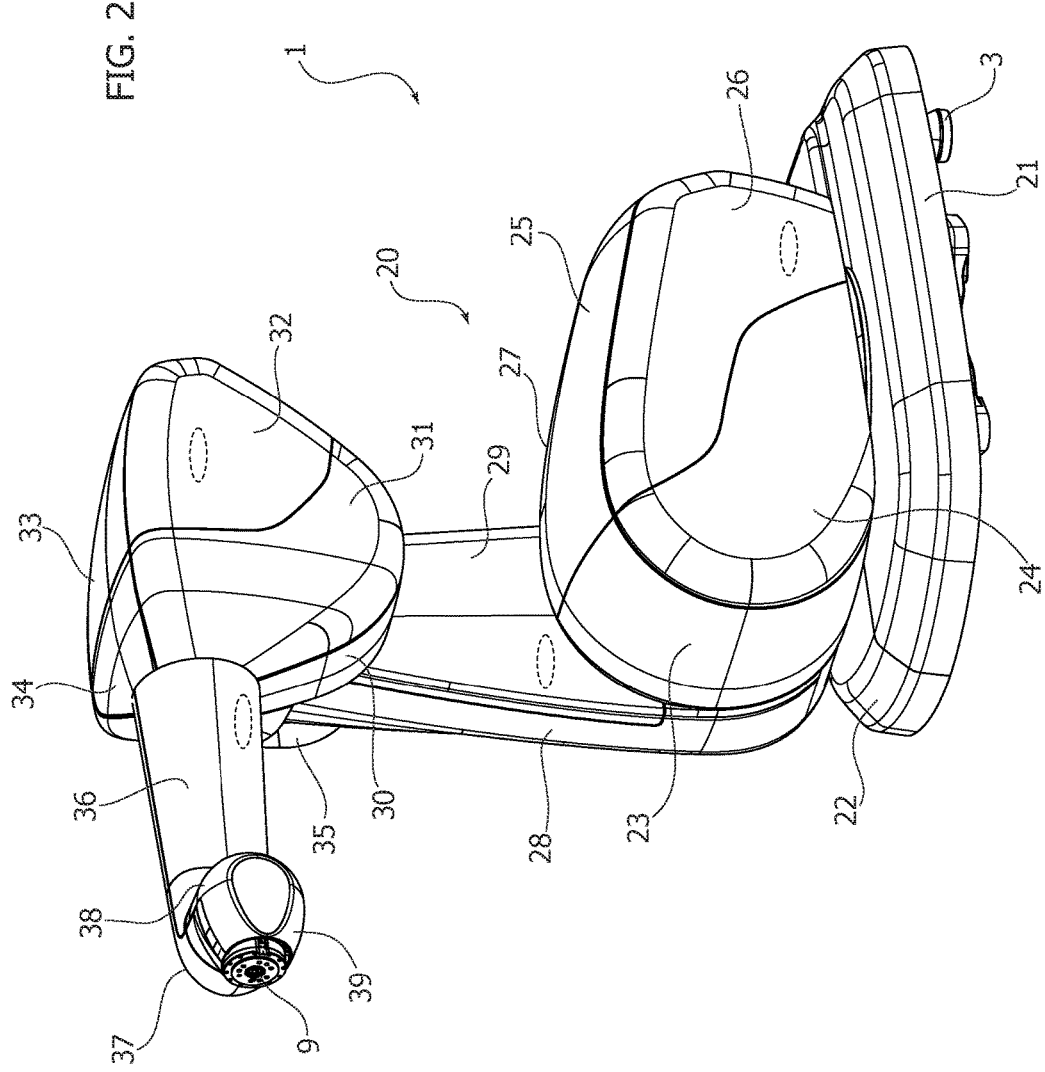
FIG. 2 is a schematic perspective view of a part of the device of FIG. 1, with a sensorized covering according to possible embodiments of the invention.

The sensorized covering 20 comprises a plurality of covering modules, some of which are designated by the reference numbers 21 to 39 only in FIG. 2, which can be assembled together to form as a whole a sort of body that coats at least part of the movable structure of the manipulator 1, preferably but not necessarily practically the entire movable structure 4-8 of the manipulator.

As will emerge more clearly hereinafter, at least some of the modules 21-39 of the covering 20 have a respective load-bearing or supporting structure, having a predefined shape, associated to which is at least one layer of elastically yielding material, i.e., one designed to absorb impact. In preferred embodiments, the load-bearing or supporting structure of each module is made of rigid or semi-rigid material, so that the structure can be provided with a desired predefined shape, which varies according to the part of the manipulator 1 (or other automated device) that is to be covered.

The plurality of modules 21-39 comprises one or more sensorized covering modules, which each include respective sensor means of the type referred to above. In the sequel of the present description, a possible embodiment of the aforesaid sensorized modules will be exemplified with reference to the modules designated by 23 and 24, taking for granted that the concepts described in relation to these modules can be applied also to other sensorized modules, for example the ones designated by 25-26, 28-29, 31-32, 36-37, 38-39 (obviously apart from the different overall shape of the modules in question, which is determined by the corresponding load-bearing structure).

In preferred embodiments, the sensorized modules include both contact sensor means and proximity sensor means. On the other hand, not ruled out from the scope of the invention is the case of modules of the covering 20 provided with just contact sensors or else just proximity sensors. The covering 20 may also include modules without sensors of the type referred to, for example in areas of the manipulator 1 for which the risks or consequences deriving from possible impact with a human operator are reduced: for example, the covering modules 21-22 of the base 3 of the manipulator 1 could be without sensors, or else be equipped with just proximity sensors, on account of the fact that the base 3 is in any case a stationary part of the manipulator. Similar considerations may apply to modules associated to movable parts of the manipulator 1, for example the module 33.

In various embodiments, at least some of the modules of the covering are to be fixed in a separable way to corresponding underlying parts of the movable structure 4-8, such as the modules 23, 25 and 36, 37 of FIG. 2. For this purpose, the aforesaid underlying parts of the manipulator 1 have purposely provided positioning and/or attachment elements for respective covering modules. These elements may be defined directly by the body of the parts of the manipulator, or else be configured as elements applied on these parts.

With reference, for example, to FIG. 1, designated by 18*a* are, for instance, two brackets for anchorage of the modules 23 and 25 of FIG. 2, designated by 18*b* is a positioning and/or resting element for the module 23, whilst designated by 18*c* is a bracket for anchorage of the module 34 of FIG. 2.

In various embodiments, fixing of the modules to the aforesaid positioning and/or attachment elements is obtained by way of additional mechanical-connection elements. For instance, partially visible in FIG. 3, where the module 24 is separate from the modules 23 and 26, is an element 19 for mechanical connection of the module 23 to the attachment element 18*a* of the column 4 of the manipulator 1. On the other hand, in possible embodiments, the load-bearing structure itself of the modules that is to be secured to parts of the manipulator 1—which is, for example, made of mouldable or thermo-formable plastic material—may be shaped so as to define directly at least part of the elements necessary for mechanical connection and/or coupling to the structure 2 of the manipulator 1.

In one or more preferred embodiments, one or more first covering modules—for example the modules 23 and 25—are secured in a separable way to respective parts of the movable structure (the column 4, with reference to the modules 23 and 25 exemplified), in particular via quick-coupling means, for example members with snap-action or slotted-fit coupling elements.

In one or more embodiments, one or more second covering modules—for example the modules 24 and 26—are secured in a separable way to one or more of the aforesaid first modules and/or are secured in a separable way together, in particular by means of quick-coupling means, for example members with snap-action or slotted-fit coupling elements. For instance, the modules 24 and 26 can be coupled in a separable way to the modules 23 and 25, respectively, which are in turn coupled in a separable way to the structure of the manipulator. Moreover, as will emerge more clearly hereinafter, the modules 24 and 26 themselves are coupled together in a separable way.

As has been said, preferentially, the means for separably coupling the covering modules together and/or to the movable structure of the manipulator are quick-coupling means, such as releasable clips with snap action or slotted-fit coupling elements. On the other hand, in alternative embodiments separable fixing of one or more modules to the structure 2 and/or together could be obtained using threaded members, such as screws and the like.

In one or more preferred embodiments, modules of the covering 20 are provided that have at least one electronic control board, preferably associated to the corresponding load-bearing structure. This control board is connected in signal communication with the control unit 15 of the manipulator 1, and electrically connected thereto are the sensor means of at least one corresponding sensorized covering module.

This control board is preferentially prearranged for managing at least operation of the sensor means and for supplying to the control unit 15 signals representing contact between the manipulator 1 and a human operator (or other foreign body) and/or signals representing the presence of a human operator (or other foreign body) within a substantially predetermined distance from the manipulator itself. As has been said, in preferred embodiments, at least one of the sensorized modules includes contact sensor means and proximity sensor means so that the corresponding control board is able to supply to the control unit 15 signals representing both of the aforesaid conditions, i.e., signals representing contact and signals representing proximity.

Each sensorized covering module may be provided with a control board of its own, or else a sensorized covering module may be provided with a number of control boards, for example a first board for management of the sensor means of the module in question and a second board for management of the sensor means of a different sensorized covering module, which may hence be without a control board of its own. There may also be envisaged sensorized modules provided with a single board that is able to manage both the sensor means of the aforesaid module and the sensor means of another module, which may hence be without a control board of its own. With the same logic, moreover, at least one control board can be carried by a non-sensorized module of the covering, connected to which are the sensor means of at least one sensorized module, which may hence even be without a corresponding control board. It will thus be appreciated that one or more modules of the covering, even though they are provided with contact sensor means and/or proximity sensor means of their own, do not necessarily have to be equipped with a corresponding control board. In this perspective, the sensor means of one or more sensorized modules without board may even be interfaced directly with the control unit 15, in which the functions of the corresponding board will be directly implemented.

Figure 3:
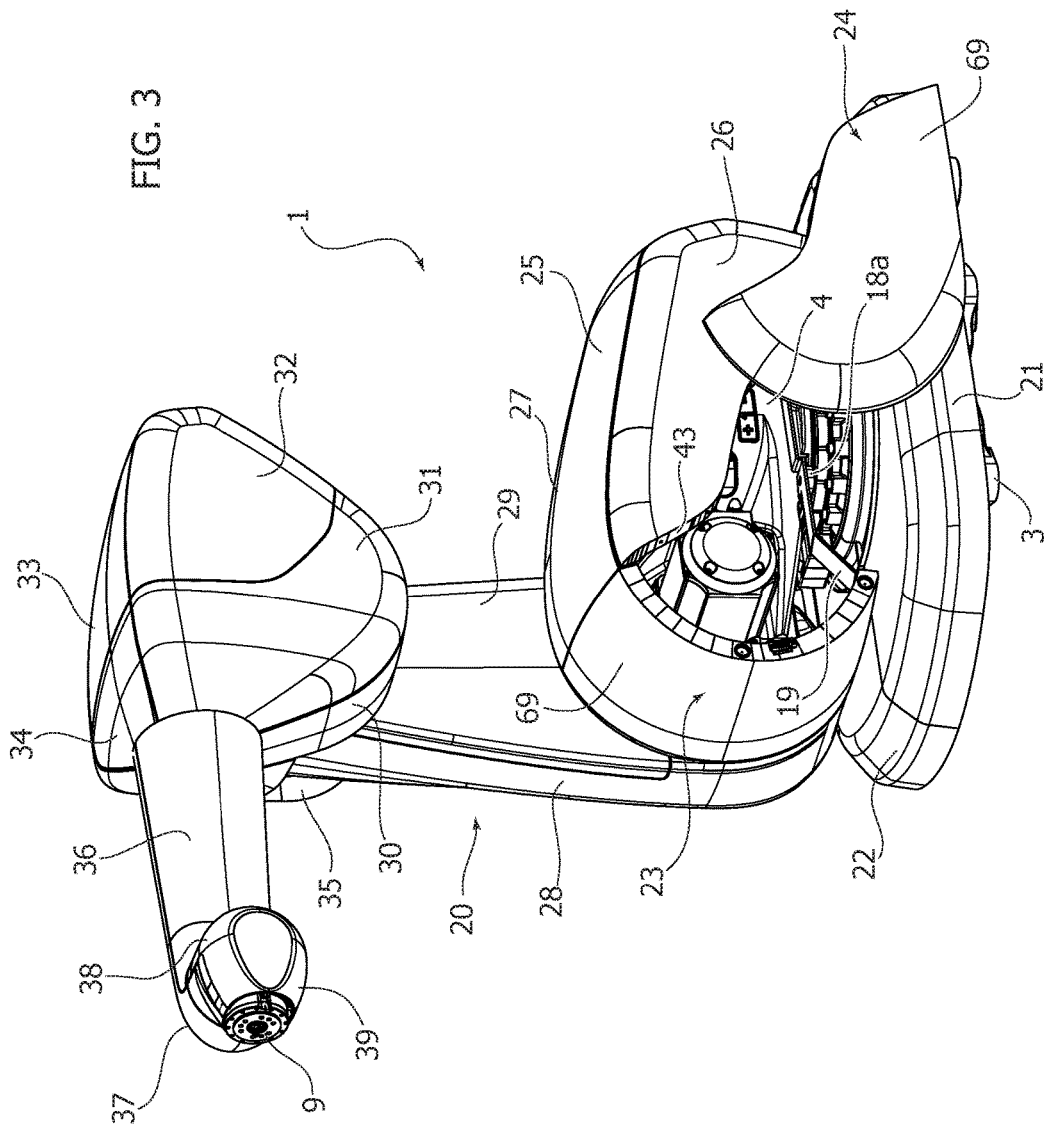
FIG. 3 is a partially exploded view of the part of the device of FIG. 2.
Figure 4:
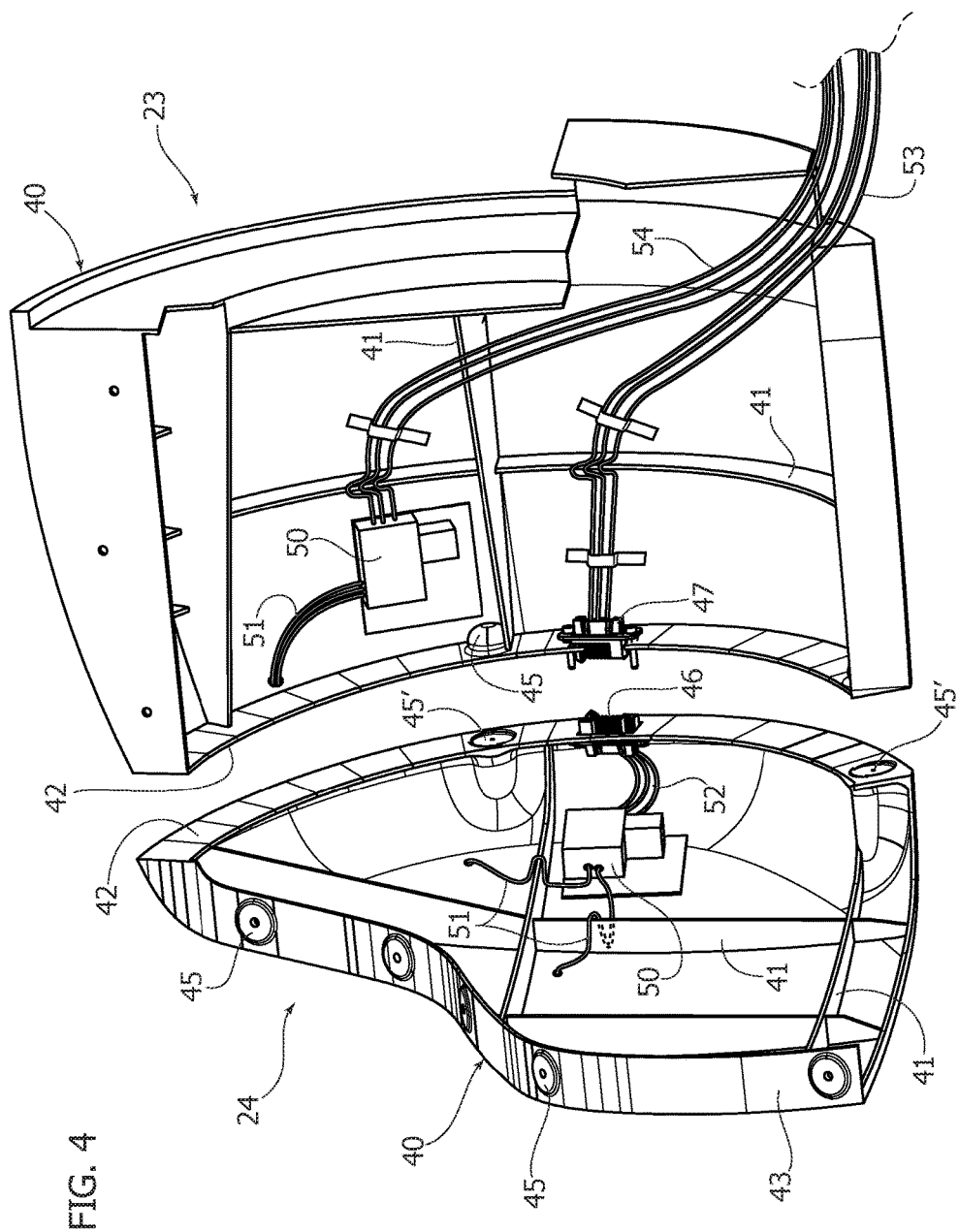
FIGS. 4 and 5 are schematic perspective views of two modules of a sensorized covering that can be used in an automated device, according to possible embodiments, respectively in a separated condition and in a coupled condition.
Figure 5:
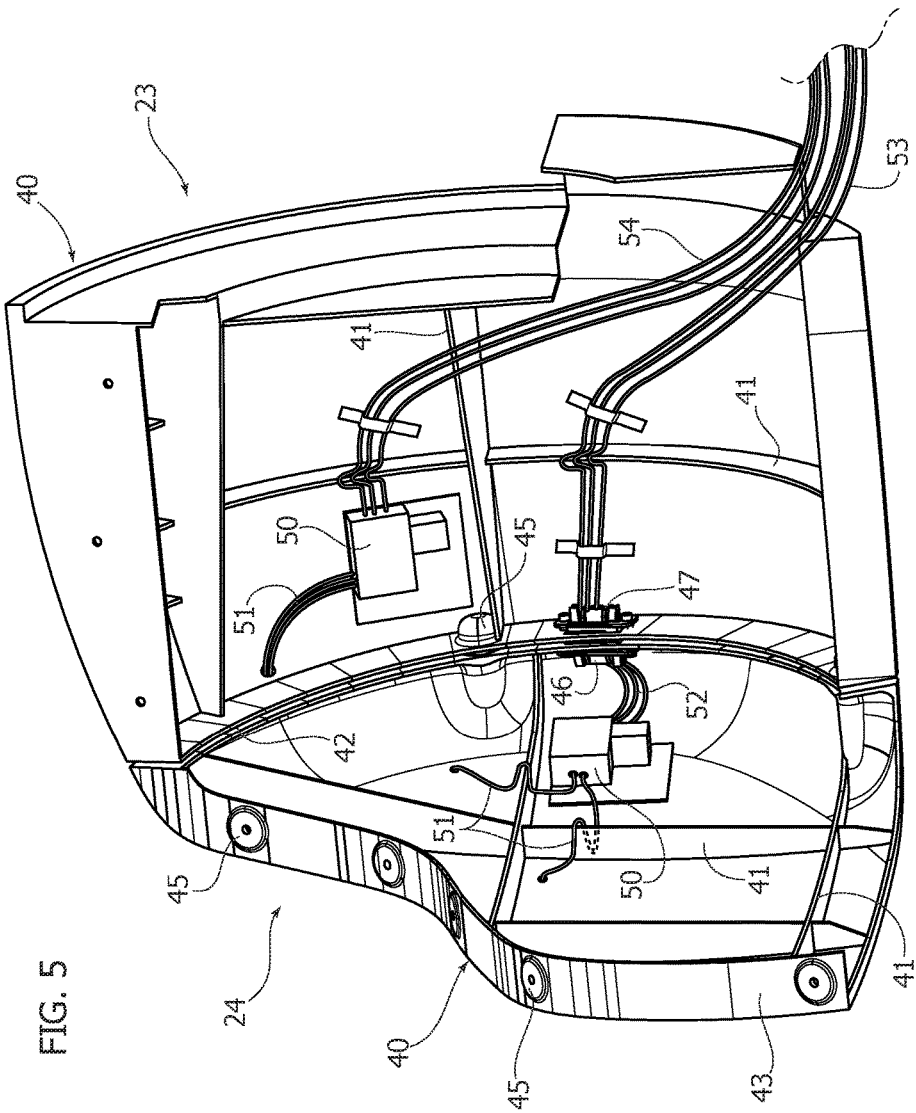

FIGS. 4 and 5 represent, by way of example, two sensorized covering modules, corresponding to the modules 23 and 24 of FIGS. 2-3. Visible in these figures is the inner side of the aforesaid modules, i.e., the side substantially facing the underlying movable structure of the manipulator 1 (here basically the column 4, see FIG. 1).

Visible in these figures is the load-bearing or supporting structure of the modules in question, designated as a whole by 40. As will emerge more clearly hereinafter, in preferred embodiments, the modules of the covering 20, have as a whole a layered structure, which includes:

at least one layer of rigid or semi-rigid material, necessary for bestowing upon the module a desired predefined shape;

at least one layer of yielding material, designed to absorb possible impact; and preferably at least one outer coating layer.

In one or more embodiments, the sensorized modules comprise one or more active layers, corresponding to the sensor means provided, and one or more passive layers, corresponding to the elastically yielding part of the module and to its outer coating. The load-bearing structure 40, which constitutes itself a layer of the covering module, is prearranged for supporting the aforesaid active and passive layers.

The structures 40 of the modules are substantially obtained in the form of shells shaped so as to follow the shape of the corresponding parts of the manipulator 1, i.e., to embrace it or cover it partially so as to provide a substantially homogeneous surface for supporting the aforesaid active and passive layers, as well as for the covering 20 as a whole.

The structures 40 are preferentially shaped so that between their inner side and the underlying parts of the manipulator 1 a free gap is defined, sufficient for housing, for example, the control electronics of the covering modules, the corresponding wiring, and the possibly projecting elements of the aforesaid covered parts of the manipulator, as well as possible members for forced ventilation, for example fans. Of course, for these reasons, the structures 40 of the various covering modules will be differentiated from one another, according to the area of the manipulator that is to be coated. For this purpose, the structure 40—which may indicatively have a thickness of between 2 and 5 mm, preferably 2.5-3.5 mm—is preferentially made of a thermoplastic polymer, for example ABS, and may hence be easily injection-moulded using known equipment. However, not ruled out from the scope of the invention is the use of thermosetting materials and/or formation of the structures 40 via thermoforming or other technologies in themselves known, for example three-dimensional printing.

In preferred embodiments, the structure 40 of at least some modules has a shape and a thickness such as to enable collapse or shattering thereof in the case where the respective covering module is involved in an impact that occurs with kinetic energy higher than a substantially predefined safety threshold. This threshold is preferentially chosen so as to prevent serious risks to the safety of a human operator, in the case of impact with the module in question: indicatively, the threshold in question—representing a limit impact energy—may be comprised between 100 N·m and 200 N·m, preferably approximately 150 N·m. In the case where it is desired to ensure maximum protection, for example for preventing also possible injury to the face of an operator, the safety threshold may be comprised between 60 N·m and 100 N·m.

With reference to FIGS. 4 and 5, it may be noted how, in one or more preferential embodiments, the structures 40 are substantially shaped like a shaped shell, preferably defining a more or less pronounced crowning or cavity, the inner side of which may be provided with stiffening ribbings, some of which are designated by 41. The control boards of the modules, when envisaged, are fixed to the inner side of a respective structure 40: in the example represented, both of the modules 23 and 24 are provided with respective control boards, designated by 50 and represented schematically. Fixing of the boards 50 to the structures 40 may occur according to known technique, for example via threaded members, or else gluing, or else by providing on the inner side of the structures 40 corresponding brackets or seats for snap-action engagement of the boards 50.

Designated by 51 is the electrical wiring used for connection of the boards 50 to the sensor means of the respective module, which, in the example considered, comprise contact sensors and proximity sensors. Given that these sensor means are positioned beyond the outer side of the structures 40 (not visible in FIGS. 4-5), the latter may be provided with holes for passage of the wiring 51.

In various embodiments, the load-bearing structure 40 of at least some of the modules has associated to it mechanical connector means, for mechanically connecting at least two covering modules together in a separable way. In preferential embodiments, the aforesaid mechanical connector means are of the quick-coupling type, for example with snap-action coupling elements.

As exemplified in FIG. 4, in preferred embodiments, the structure 40 of a first module—in the example, the module 23—has at least one peripheral surface or wall 42 designed to face a corresponding peripheral surface or wall 42 of a second adjacent module—in the example, the module 24—where associated to said facing surfaces or walls are the aforesaid connector means for mechanical connection, designated by 45 and 45'. In the example, the connector means 45 are substantially of a male type, whereas the connector means 45' are substantially of a female type. Mechanical connectors of the type referred to may be provided also on modules without sensor means.

In various embodiments, the load-bearing structure 40 of at least some of the modules has associated to it electrical connector means, for electrically connecting together two covering modules, in a separable way. In the example illustrated in FIG. 4, the aforesaid electrical connector means are designated by 46 and 47, the connector means 46 being substantially of a male type and the connector means 47 being substantially of a female type. Preferentially, and as exemplified in FIG. 4, the electrical connector means 46, 47 are associated to facing walls 42 of two modules to be coupled electrically, here the modules 23 and 24, preferably in addition, but possibly also as an alternative, to the mechanical connector means 45, 45'.

It is clear that the structure 40 of a module—even without sensor means—may have a number of surfaces or walls designed to face corresponding surfaces or walls of adjacent modules, these facing walls having associated to them respective mechanical connector means and/or electrical connector means: FIG. 4 represents, in fact, the case where the structure 40 of the module 24 has a surface or wall 43 (here generally transverse or orthogonal to the wall 42 of the module itself) that is provided with mechanical connector means 45, designed to couple with respective complementary mechanical connector means provided on the surface or wall of the module 26 designated by 43 in FIG. 3. In addition or as an alternative, on the walls 43 of the modules 23 and 26 there could be provided electrical connector means of the type referred to previously. There may obviously also be provided a number of electrical connector means, on one and the same wall 42 or on a number of walls 42, 43 of a first module, designed for separable coupling with complementary electrical connector means, carried by corresponding walls of second modules adjacent to the first modules.

Once again in FIG. 4, designated by 52 is the wiring for electrical connection of the control board 50 of the module 24 to the corresponding electrical connector means 46, whereas designated by 53 is the wiring for connection of the electrical connector means 47 of the module 23 to the control unit 15 of FIG. 1 (or else, as already mentioned, to an electrical connector means 46 or 47 of another module, which is not necessarily sensorized). Designated by 54 is the wiring for electrical connection of the control board 50 of the module 23 to the control unit 15 of FIG. 1 (or else to an electrical connector means 46 or 47 of another module, which is not necessarily sensorized). The supporting structure 40 of the modules may be shaped so as to define, on a peripheral wall thereof, at least one passage for guiding the wiring, as illustrated, for example, for the module 23 in relation to the sets of wiring 53, 54.

As emerges from FIG. 4, the shape substantially resembling a generally concave or crowned shell of the structures 40 ensures effective housing of the control boards 50 and corresponding sets of wiring 51-53, the latter being preferentially anchored locally to the inner side of the structures themselves, for example via adhesive tapes or suitable cable-runners.

In FIG. 5, the modules 23 and 24 are represented in a coupled condition, i.e., with the respective walls 42 of FIG. 4 in contact with or adjacent to one another, and with the mechanical connector means 45, 45' and the electrical connector means 46, 47 coupled together. With reference to this drawing, it is assumed that the ends of the sets of wiring 53 and 54 are electrically connected to the control unit 15 of FIG. 1, with some conductors of the wiring that are used by the control unit 15 for providing the necessary electric-power supply (preferably a low-voltage supply) to the control boards 50, and other conductors of the aforesaid wiring that are, instead, used by the control boards 50 for supplying to the control unit 15 the signals representing detections made by the sensor means, i.e., detection of a contact or impact between the manipulator 1 and a human operator (or other foreign body) and/or the presence of a human operator (or other foreign body) in the proximity of the manipulator itself.

In this way, thanks to the independent electrical connections, various modules of the covering 20—here exemplified by the modules 23 and 24—are able to operate independently of one another, even in the event of failure of one of the modules. An approach of this sort evidently enables various possible configurations for the covering 20, which may comprise sensorized modules that substantially cover the entire movable structure of the manipulator 1 or else just a part thereof deemed critical for the purposes of co-operation with a human operator, according to final application of the robot.

It will likewise be appreciated that, in this way, the control unit 15 may also be prearranged for identifying the control board 50 of the sensorized module that supplies one of the aforesaid signals representing contact or proximity, with the control unit itself that hence recognises the module in question, corresponding to the area of the manipulator in which there has occurred contact and/or there has been detected proximity of an operator or other foreign body, in order to undertake the necessary actions.

For instance, given that the proximity sensor means are configured for detecting the presence of a foreign body within a maximum distance of 15-20 cm, following upon a detection made via said sensor means, the control unit can govern a reduction of the speed of displacement of the manipulator 1 to a speed deemed safe for a human operator, for example comprised between 150 and 250 mm/s.

Similar strategies may be implemented following upon contact caused by a human operator against the manipulator. For instance, suppose that, after a reduction of speed caused by a previous signal generated by the proximity sensor means, the human operator performs an unexpected displacement and accidentally bumps against the surface of a sensorized module. Following upon the consequent signal generated by the contact sensor means, the control unit 15 may stop the movement of the manipulator 1, or else reverse the direction movement thereof. It should be noted that the contact made by the operator against the sensorized covering may also be voluntary, for example when the operator himself wants to stop operation of the robot.

The fact that the control unit 15 is able to identify the sensorized module from which the contact and/or proximity signals come will possibly enable adoption of control strategies aimed at increasing the safety of a human operator, in particular for coordinating the movement of a number of parts of the movable structure 2. With reference for example to FIG. 2, suppose, for example, that a contact is detected via the module 39, when the forearm (7, FIG. 1) of the manipulator 1 is located in a position inclined downwards. A possible control strategy may then envisage that the control unit 15 will drive both a raising of the aforesaid forearm 7 and a simultaneous oscillation backwards (as viewed in FIG. 1) of the arm 5. Obviously, this is only a non-limiting example, given that the possible combinations of movements are innumerable.

It will be appreciated that, in one or more embodiments, the control unit 15 may be configured, via suitable programming, for exploiting the sensorized covering modules as a sort of user interface, aimed at enabling the human operator to impart basic instructions on the control unit 15.

As already mentioned, a single contact with a sensorized module may be deemed indicative of a situation that is potentially dangerous for a human operator, following upon which safety strategies are implemented. On the other hand, for example, three contacts on a sensorized module that occur in rapid succession (that the operator may make even with just the finger of one hand) may indicate the desire on the part of the operator to stop the manipulator temporarily, without the robot having to implement any safety strategy. Starting from this condition of controlled arrest, a subsequent sequence of contacts on a module—for example two or four contacts in rapid succession—may indicate the intention of the operator to restart operation of the manipulator.

In various embodiments, adjacent modules of the sensorized covering 20 are not provided with mechanical connector means and electrical connector means of the type referred to previously. This is typically the case of modules that, albeit rather close to one another, cover parts of the manipulator 1 capable of relative movement.

With reference to FIG. 2, it will be appreciated, for example, that the module 23, on the one hand, and the module 28 (or 29), on the other, partially cover the column 4 and the arm 5 of the manipulator 1 (see FIG. 1), respectively, i.e., parts of the manipulator that are able to perform relative displacements. Between these modules 23 and 28 no mutual-coupling connector means, whether mechanical or electrical, are hence provided. If necessary, electrical connection may be obtained using flexible cables that extend between the modules in question, exploiting the already mentioned free housing spaces allowed by the shell-like shape of the structures 40 of the modules themselves; these spaces are also sufficiently wide to enable movements of the aforesaid cables as a result of displacements of the movable parts 4 and 5. Of course, considerations of this type also apply to other modules of the sensorized covering 20, such as—with reference once again to FIG. 2—the modules 23 or 25 and 29, the modules 29 and 30, the modules 38-39, on the one hand, and the modules 36-37, on the other, or again the modules 30, 31, 34, 35, on the one hand, and the modules 36-37 on the other (the modules 36-37 are fixed with respect to the forearm 7 and are thus able to turn therewith with respect to the modules 30, 31, 34, 35 that cover the elbow 6 of FIG. 1).

As mentioned previously, in preferential embodiments, at least the sensorized modules of the covering 20 comprise a plurality of active layers and passive layers supported by the load-bearing structure 40.

Figure 6:
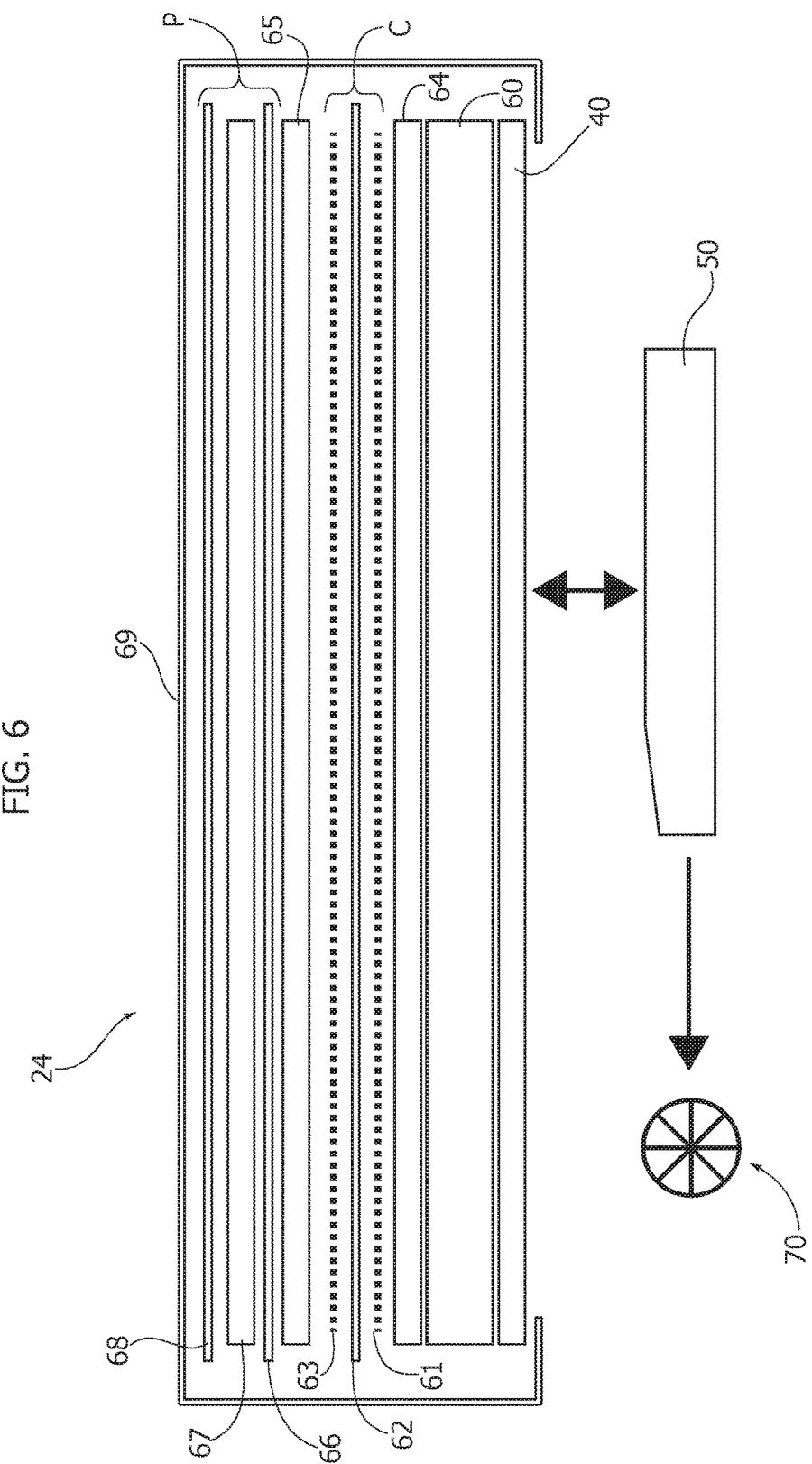
FIG. 6 is a schematic cross-sectional representation of a possible layered configuration of a covering module of a sensorized covering according to possible embodiments of the invention.

Represented in FIG. 6 merely by way of non-limiting explanation is a possible layered structure of a sensorized module, which is here assumed as being the module 24 of FIGS. 4 and 5. In this figure, representation of the electrical-connection wiring has been omitted for reasons of greater clarity.

In preferred embodiments, associated to an outer side of the supporting structure 40 of a covering module is a cushioning layer, made of elastically yielding material, which is prearranged for absorbing the kinetic energy deriving from impact against the module in question. This cushioning layer, designated by 60 in the example of FIG. 6, may be made of a polymeric foam, for example expanded polyurethane. The layer 60 may have a thickness of between 5 and 10 mm, preferably approximately 6-8 mm.

Preferentially, the cushioning layer 60 is prearranged for absorbing a kinetic energy not higher than the safety threshold referred to previously, corresponding to collapse or failure of the load-bearing structure 40. Indicatively, then, and with reference to what has previously been exemplified in relation to the structure 40, the cushioning layer 60 may for example be prearranged for absorbing impact with a kinetic energy lower than 60 N•m, or else 100 N•m, or else 150 N•m, or else 200 N•m, according to the desired degree of safety.

In one or more embodiments, provided on top of the cushioning layer 60 of a sensorized module are the contact sensor means. In general, the contact sensor means may be of any known type.

In preferred embodiments of the invention, the contact sensor means are of a flexible type and provided so as to extend over an area substantially corresponding to that of the outer face of the module in question, or to a prevalent part thereof. In the non-limiting example of FIG. 6, these contact sensor means are designated as a whole by C and have themselves a structure formed by layers set on top of one another.

In one or more embodiments, the contact sensor means comprise a piezoresistive layer 62, which is set between a lower electrically conductive layer 61 and an upper electrically conductive layer 63. Preferentially, the piezoresistive layer 62 comprises a fabric made of piezoresistive material or a material rendered piezoresistive, for example a fabric made of synthetic insulating material (such as nylon and/or spandex) coated with a conductive polymer. Piezoelectric fabrics of this type are, for example, manufactured by Eeonyx Corporation, U.S.A. The layers 61 and 63 preferentially comprise a fabric made of electrically conductive material or material rendered electrically conductive such as, for example, a metal fabric. Conductive fabrics of this type are, for example, manufactured by Texe S.r.l., Italy, bearing the trademark INNTEX.

The layers or fabrics 61-63 are very thin (indicatively, the overall thickness of the layers 61-63 set on top of one another does not exceed 5 mm, preferably 2.5-3.5 mm) and are hence intrinsically flexible.

In operation, a difference of potential is applied between the conductive layers 61 and 63, and the electrical resistance of the piezoresistive layer 62 is measured via corresponding components provided on the corresponding control board 50. In the presence of a pressure applied on the layers 61-63, the local resistance of the piezoresistive layer varies, for example decreasing, it being then possible to detect this variation via the aforesaid components of the board 50.

The contact between the two conductive layers 61, 63 is a particular condition that corresponds to a resistance of the intermediate piezoelectric layer of 0Ω, such as to produce a false response of the sensor C. For this reason, in various embodiments, the piezoresistive layer 62 has perimetral dimensions larger than those of the conductive layers 61 and 63, in such a way that a peripheral portion of the layer 62 projects peripherally beyond the layers 61 and 62. This configuration hence creates the presence of a sort of non-sensitive frame, which surrounds the sensitive part of the sensor: the presence of the projecting peripheral part of the layer 62 prevents direct contact between the layers 61, 62, and hence prevents short circuits that would give rise to false responses.

In preferential embodiments, the contact sensor means of a sensorized covering module are set between a lower covering layer and an upper covering layer, which are made of elastically yielding and electrically insulating material. With reference to the non-limiting example of FIG. 6, designated by 64 and 65 are the aforementioned lower and upper covering layers, respectively, set between which are the contact sensor means C. The layers 64 and 65 may be made of a polymeric foam, preferably a closed-cell polymeric foam. Preferentially, the layers 64 and 65 have a thickness of less than 4 mm, preferably 1.5-2.5 mm.

When a charge is applied on the upper covering 65, for example following upon impact between the covering module in question and a human operator, the yielding material of the layers 64 and 65 undergoes deformation, thus determining a pressure on the active layers 61-63, and thereby activating the contact sensor means C, as explained above. The internal structure of the polymeric foam used for the production of the layers 64 and 65 hence enables transmission of the forces practically completely to the sensor means C set in between, absorbing only a modest amount of energy.

As may be noted, in the example of FIG. 6 the lower covering layer 64 is set on top of the cushioning layer 60.

The sensitivity of the sensor means C depends of course upon various aspects and properties of the layers 61-63 chosen and of the corresponding covering layers 64-65 (such as the electrical resistance of the piezoelectric layer or fabric 62, the elasticity of the layer or fabric 62 and of the layers or fabrics 61, 62, the type of material of the covering layers 64, 65, its density and compressibility, the thickness of the covering layers 64, 65, and the position of the sensor means C within the layered structure of the covering module). For this purpose, the desired calibration for the sensor means C may be performed in the design stage and on the basis of experimental tests, according to the type of implementation chosen (shapes, materials, thicknesses, etc).

It should be considered that the contact sensor means C of the type referred to are also suitable for performing functions of force sensors, considering that the greater the pressure exerted thereon (i.e., on the outside of the covering module), the more the value of resistance detected differs (e.g., is lower). On this basis, the control unit 15 may be prearranged to interpret a strong and prolonged thrust for some seconds (e.g., 2-3 seconds) as a command aimed at obtaining movement of the manipulator in a direction opposite to the one from which the thrust comes. In this way, an operator can exert with his hand such a thrust on a given sensorized covering module, in order to bring about displacement of the manipulator in the opposite direction, as long as the thrust is maintained.

As has been said, in one or more embodiments, one or more sensorized modules comprise proximity sensor means. When a sensorized module comprises both the contact sensor means and the proximity sensor means, the latter are in a higher position than the former, i.e., in a more external position with respect to the structure 40, which represents the innermost layer of a covering module. In the case of sensorized modules that include, instead, only the proximity sensor means, the layers 61-64, and possibly 65, of FIG. 6 may be omitted, possibly increasing the thickness of the cushioning layer 60 accordingly.

The proximity sensor means may be of any known type, but are also preferably of a flexible type and obtained so as to have a surface area substantially corresponding to that of the outer face of the module in question or of a predominant part thereof. In the non-limiting example of FIG. 6, these proximity sensor means are designated as a whole by P and have themselves a structure consisting of layers set on top of one another.

In one or more embodiments, the proximity sensor means are of a capacitive type and comprise a first layer and a second layer of electrically conductive material, set between which is at least one layer of electrically insulating material. With reference to the non-limiting example of FIG. 6, designated by 66 and 68 are the aforesaid first and second conductive layers, whereas designated by 67 is the aforesaid intermediate insulating layer, the upper layer 68 being the sensitive layer for the purposes of proximity detection.

Preferentially, the conductive layers 66 and 68 each comprise a fabric made of electrically conductive material or a material rendered electrically conductive, for example a polyester fabric plated with copper and coated with nickel. Conductive fabrics of this type are manufactured, for example, by 3M Company, U.S.A. In various embodiments, the intermediate layer 67 is preferably made of elastically yielding material, for example a polymeric foam, preferably a closed-cell polymeric foam.

As may be noted, in the example of FIG. 6, the first electrically conductive layer 66 is set on top of the upper covering layer 65.

In a possible practical embodiment, the proximity sensor means P comprise the conductive layer 68, used as capacitive sensor, which is connected to a capacitive sensing chip based upon an LC circuit (such as the chip FDC2214 manufactured by Texas Instrument Incorporated, U.S.A.), provided on the control board 50 for acquisition and processing of the data (see the data sheet of the chip referred to above and the corresponding application notes). Basically, when a human operator (or other foreign body) approaches the conductive layer 68 there occurs a variation of capacitance in the LC module and a consequent variation of an oscillating frequency. The measurement of this frequency variation, made by the chip, hence represents the proximity of the human operator (or other foreign body) to the layer 68, i.e., to the outer side of the sensorized covering. As already mentioned, the sensor means P may be configured in such a way that the maximum distance from the layer 68 within which the presence of a foreign body can be detected is approximately 15-20 cm.

The conductive layer 66, set underneath the sensitive layer 68, operates substantially as a screen, in order to prevent false detections, due for example to movements of objects that are located beyond the inner side of the load-bearing structure 40 (consider a wiring that displaces following upon a movement of the manipulator), which would reduce the sensitivity of the layer 68 with respect to the opposite side of the covering module that is of actual interest. The lower conductive layer 66 may be used as a passive screen or as an active screen, according to the type of connection implemented on the board 50. As has been said, the sensitive layer 68 and the screen layer 66 of the sensing means P are separated from one another by the layer 67.

Finally, each module preferentially comprises an outer coating layer, which may for example be made of a technical fabric or of a synthetic leather. With reference to the non-limiting example of FIG. 6, the coating layer is designated by 69. The layer 69 has in particular the function of insulating the sensor means P from the outside of the covering module, preventing direct contact of the conductive layer 68 with persons or objects.

In the case of sensorized modules in which the coating layer 69 is set on top of the second electrically conductive layer 68 of the proximity sensor means P, it is then preferable for the aforesaid coating layer 69 to be made of electrically insulating material. In the case of sensorized modules that include just the contact sensor means C, the coating layer 69 will, instead, be set on top of the upper covering layer 65, which is in itself already electrically insulating, or else, in the absence of the latter, on the conductive layer 63. The coating layer 69 may have a thickness comprised between 0.5 and 1.5 mm, even though a larger thickness thereof is not ruled out, provided that a flexibility or elastic yielding thereof is guaranteed.

In various embodiments, such as the one exemplified in FIG. 6, the coating layer 69 extends also on the peripheral sides of the structure constituted by the layers 40, 60-68 and is secured to the load-bearing structure 40, for example to its inner side and/or to walls of the type designated by 42-43 in FIGS. 4-5. This does not, however, constitute an essential characteristic. The coating layer 69 may in fact be formed by a suitable paint, preferably an electrically non-conductive paint.

Also represented schematically in FIG. 6 are the control board 50 of the module 24 exemplified, as well as means for forced ventilation, designated by 70, for example a fan with electric motor.

In various embodiments, one or more fans 70 may be mounted on parts of the structure of the manipulator 1 covered by the covering 20, where these parts are provided with suitable supports designed for the purpose. On the other hand, according to preferred embodiments, the fans are mounted on the inside of the structure 40 of one or more modules, which are not necessarily sensorized modules. The presence of these means of forced ventilation favors circulation of air within the cavity defined by the covering 20, for example in order to facilitate cooling of components enclosed within the covering (such as the boards 50 or the motors M of the joints of the manipulator 1). In order to enable circulation of the cooling air (i.e., intake of air from outside and expulsion of the hotter air outwards), one or more modules of the covering 20 may be provided with passages, for example in the form of a series of slits, represented schematically dashed in FIG. 2.

Operation of the ventilation means 70 may be controlled by the control board 50 of a sensorized module (not necessarily the same as that on which the fan is mounted). For this purpose, in possible embodiments such a board 50 is advantageously provided with a temperature sensor (e.g., of an NTC type) in order to activate the ventilation means when the temperature of the air detected within an area circumscribed by the covering 20 reaches or exceeds a predefined threshold.

In various embodiments, for the purposes of production of a sensorized module, such as the module 24 of FIG. 6, the various layers are assembled using adhesives, which are designed to keep the layers adherent to one another and prevent any possible sliding thereof following upon contact or impact.

As already mentioned, the base layer represented by the load-bearing structure 40 is obtained in the form determined in the design stage, the shape of which will be variable according to the area of the manipulator to be covered. The structure 40 is preferentially made of a rigid or semi-rigid plastic material, via injection moulding, or thermoforming, or other suitable technique.

Next, the cushioning layer 60 is set on the corresponding load-bearing structure 40 and fixed thereto via adhesive. For this purpose, the layer 60 is obtained with a shape and size such as to reproduce at least those of the outer side of the load-bearing structure 40 in order to cover it entirely or practically entirely. The layer 60 may, for example, be cut or dinked from a sheet of the material used. Also the active layers 61-63 and the covering layers 64 and 65 are obtained in the necessary shapes and sizes, for example via cutting or clinking (as has been said, preferentially the piezoresistive layer 62 has a greater width than the conductive layers 61, 63), and gluing thereof is then carried out. The covering layer 64 is glued on the cushioning layer 60 and the layers 61-63 are then glued thereon in succession, the covering layer 65 being then glued on the layer 63. The layers 61-65 are assembled together, in the order illustrated, preferably using one or more glues having a reduced adhesive capacity or in any case an adhesive capacity less than that of the glue or glues used for securing the layer 60 to the structure 40, the aim being not to alter the elasticity of the sensitive layers 61-63, but at the same time to obtain a stable sensor. Of course, application of the glues between the layers 61-63 is such as not to insulate said layers electrically from one another.

Next, also the further active layers 66, 68 and the corresponding intermediate passive layer 67 are obtained in the necessary shapes and sizes in order to cover an area substantially corresponding to the outer face of the covering module or to a prevalent part thereof. As for the previous layers, also in this case it is possible to use techniques of cutting or clinking starting from larger sheets of the starting materials.

The layers 66-68 are then glued in succession on the layer 65, also in this case preferably using glues with reduced characteristics of adhesion, for the reasons explained above in relation to the layers 61-65.

Finally, the outer coating layer 69 is applied, which may also be glued on the underlying layered structure or else, as mentioned, applied in the form of paint.

Figure 7:
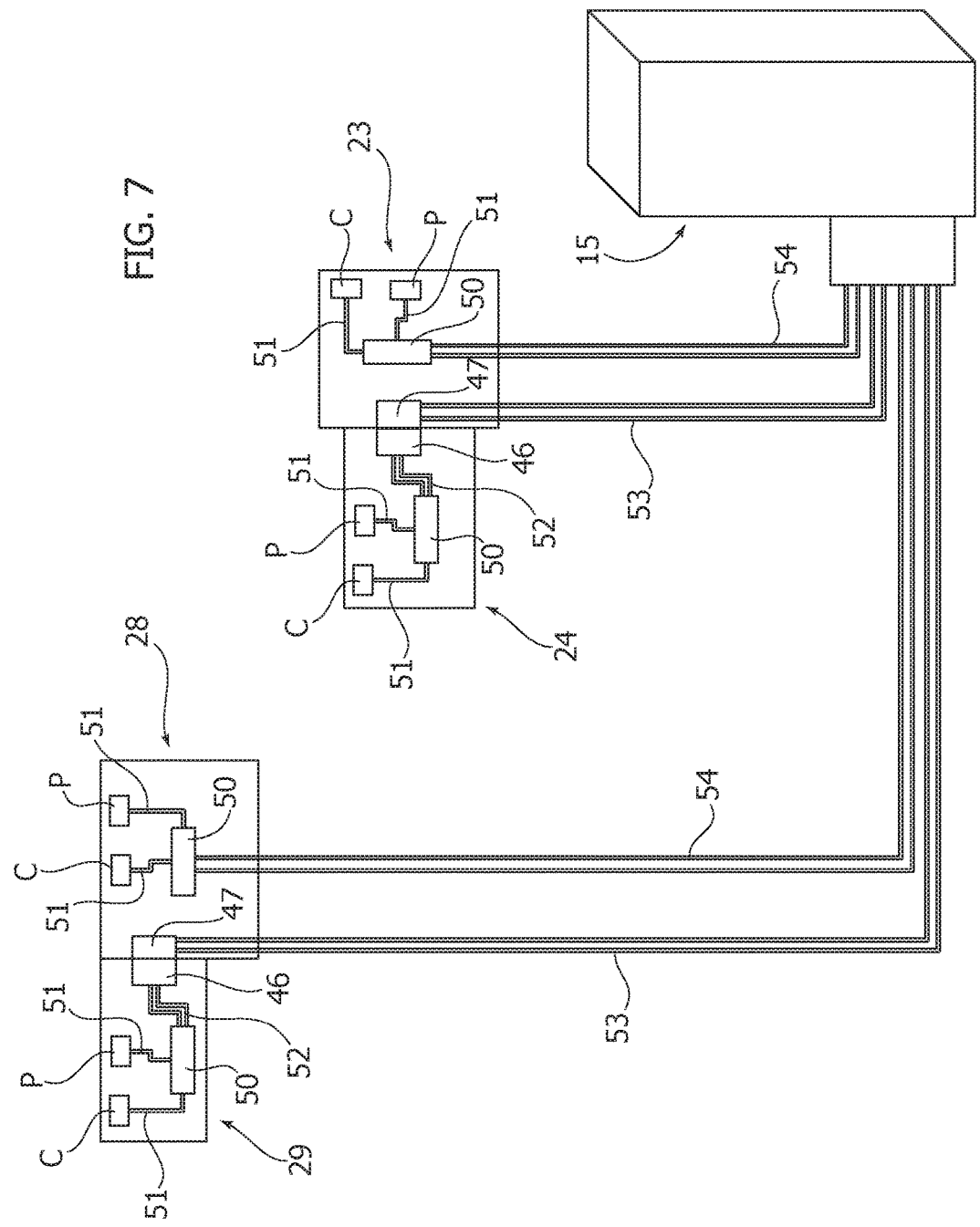
FIGS. 7-11 are partial and schematic illustrations of some alternate configurations of electrical connection between covering modules of a sensorized covering according to possible embodiments of the invention.

FIG. 7 is a schematic illustration of a possible mode of connection of some sensorized modules, such as for example the modules 23-24 of FIGS. 4-5 and the modules 28-29 of FIG. 2. As already mentioned, in embodiments of this type, sets of wiring 53, 54 are provided that connect the control boards 50 of the various modules to the control unit 15, where these sets of wiring include conductors for carrying the electric-power supply from the unit 15 to the boards 50 and for carrying from the boards 50 to the unit 15 the signals representing detections made by the sensor means C and/or P, the wiring 53 exploiting the presence of the wiring 52 and of the electrical connector means 46-47 of the coupled modules.

Figure 8:
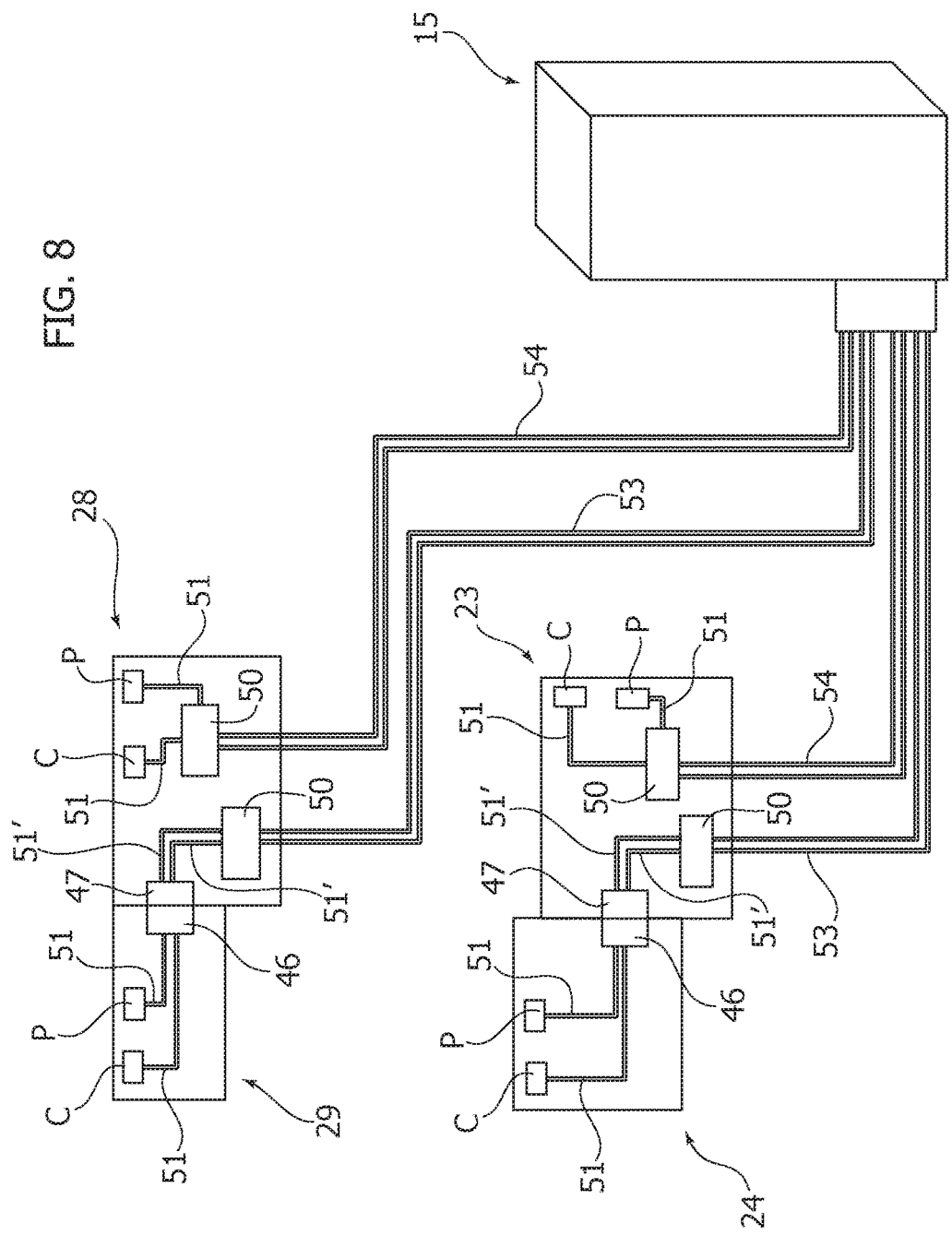

Of course, the configurations of electrical connection of the covering modules to the control unit 15 may be multiple according to the design approach adopted. For instance, FIG. 8 is a schematic illustration of the case already referred to of modules—here exemplified by the modules 23 and 28—associated to the load-bearing structures of which are two control boards 50, one in signal communication with the sensor means C and/or P of the corresponding module 23 or 28, and the other to which sets of wiring 51' are connected for connection to the sensor means C and/or P of the adjacent modules 24 and 29, respectively. In this case, the electrical connector means 46-47 are exploited for connecting together the sets of wiring 51' provided on the modules 23 and 28 to the sets of wiring 51 provided on the modules 24 and 29.

Figure 9:
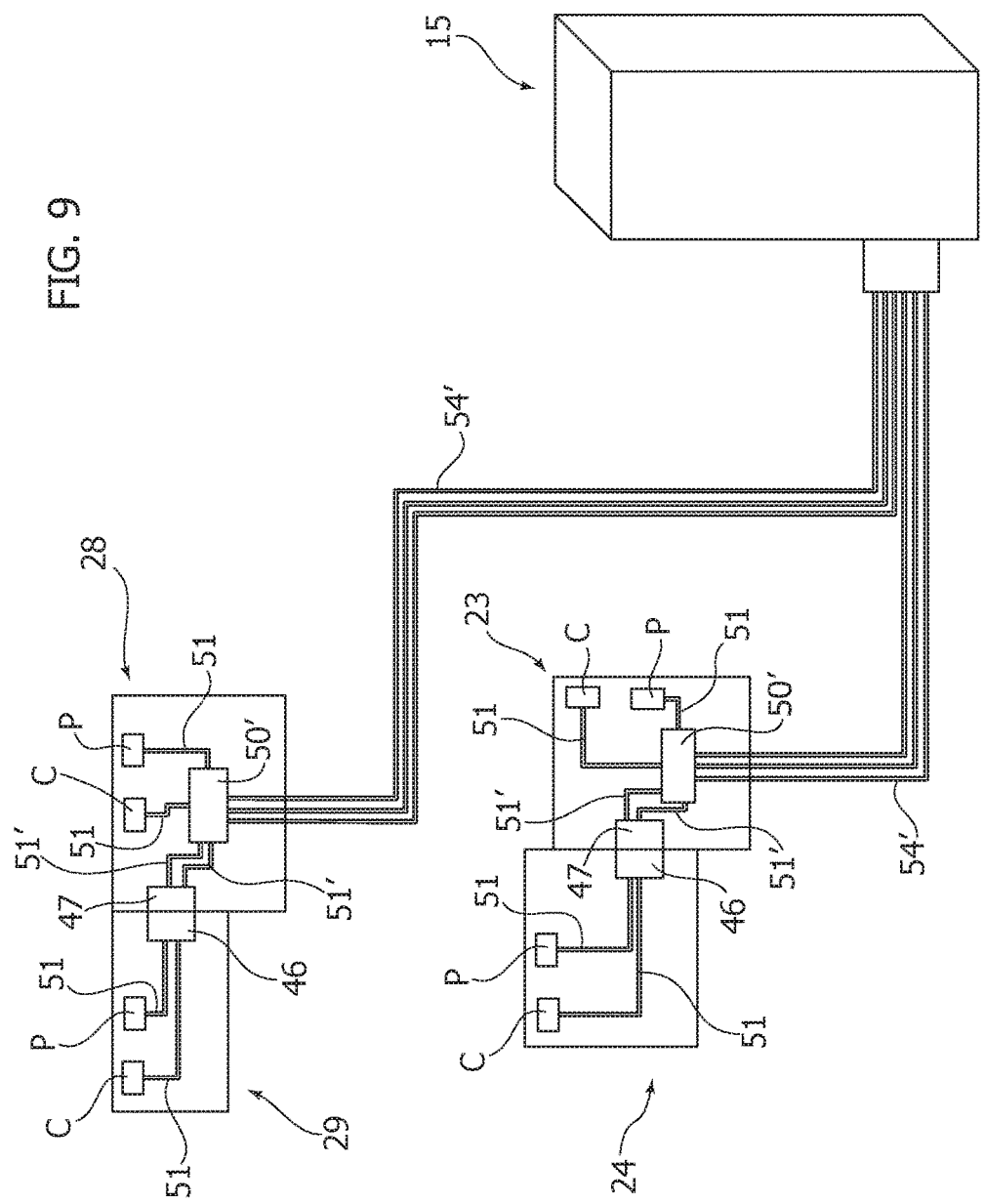

FIG. 9 exemplifies, instead, the case of boards 50' prearranged for connection to a plurality of sensor means C and/or sensor means P. In the example, the boards 50' are associated to the load-bearing structures of the modules 23 and 28 and connected both to the respective sensors C and/or P via the sets of wiring 51 and to the sensors C and/or P of the modules 24 and 29, via the sets of wiring 51' on the modules 23 and 28 and the sets of wiring 51 on the modules 24 and 29. Also in this case, the electrical connector means 46-47 of the adjacent modules 23-24 and 28-29 are exploited for connecting together the sets of wiring 51' and the sets of wiring 51 of the modules coupled together. In solutions of this type, sets of wiring 54' are then provided that extend only between the unit 15 and the modules 23, 28 (i.e., the corresponding boards 50') for electrical supply and for carrying the signals generated via the sensor means C and/or P of all the modules represented.

Figure 10:
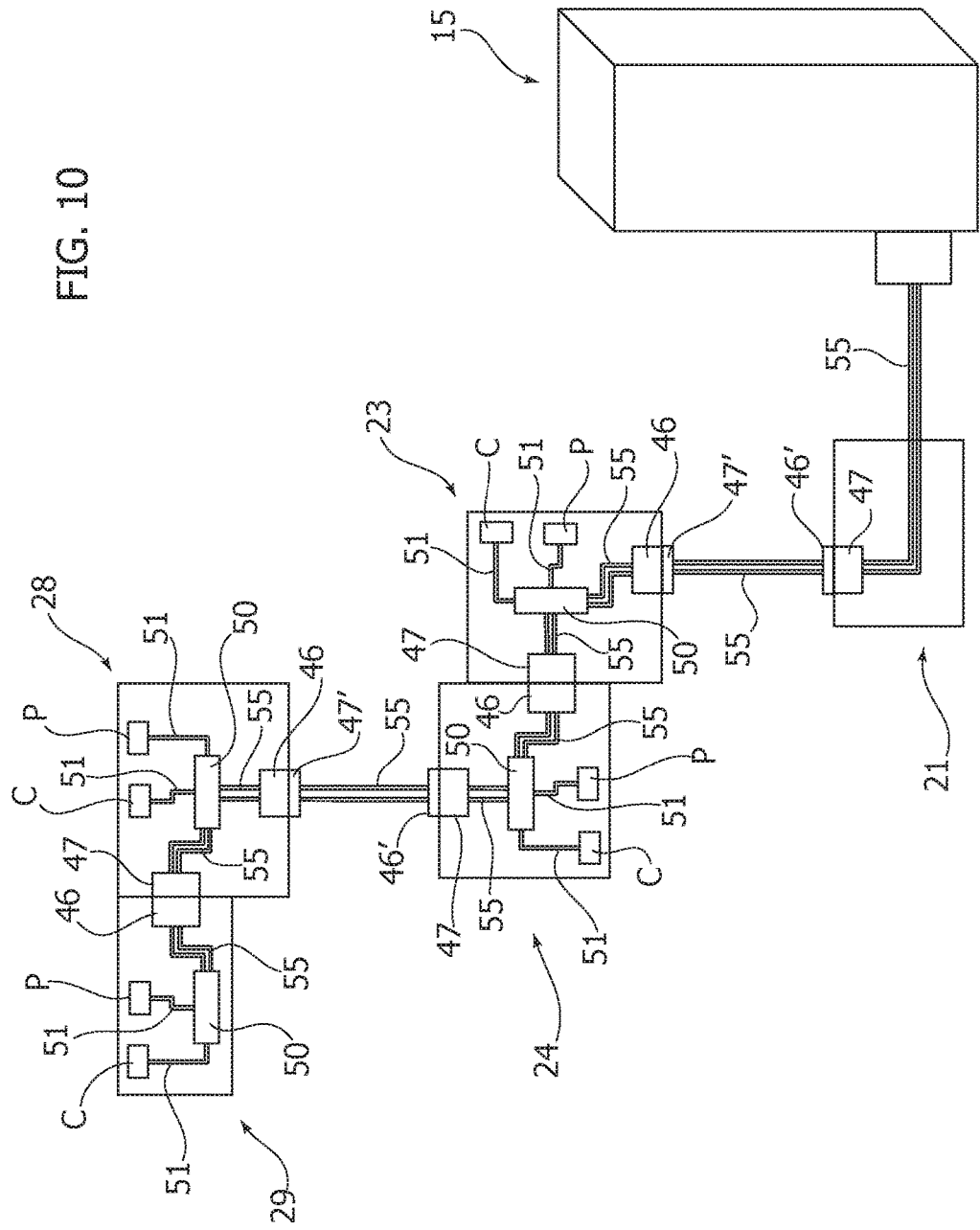

FIG. 10 exemplifies the case of a connection in series between the boards 50 of various sensorized modules and the control unit 15, substantially according to an architecture of a daisy-chain type. In this case, a wiring 55 is substantially provided, which comprises conductors for carrying electric-power supply to the boards 50 of the various modules 23, 24, 28, 28, and conductors for carrying the data representing the detections made via the sensors C and/or P of the various modules connected. The boards 50 may conveniently include respective communication nodes for transmission of the aforesaid data, according to a suitable standard or proprietary protocol.

In the case exemplified, the wiring 55 is divided into lengths, some of which are present on the various modules, between each board and a respective electrical connector means 46 or 47, as well as second lengths for connecting together non-adjacent modules or in any case modules not provided with mutual-coupling connector means (such as the modules 24 and 28). These second lengths may be conveniently equipped, at the ends thereof, with electrical connector means 46', 47' complementary to the electrical connector means 46 and 47 of the modules to be connected. It will thus be appreciated that, in one or more embodiments, the modules may be provided also with a plurality of electrical connector means 46, 47.

FIG. 10 likewise illustrates the case of modules—such as the module designated by 21—which, albeit not provided with sensors C and/or P, are in any case equipped with electrical connector means.

It will be appreciated that, in various embodiments, the configuration of the network used for connecting together the control unit 15 and a plurality of modules may be different from the one exemplified in FIG. 10, for instance using a bus architecture, a ring architecture, a star architecture, etc.

It should be noted that, in embodiments with a connection in series of the type exemplified in FIG. 10, removal of a module that determines separation between two connector means 46-47 causes interruption of the sensor functions of the entire covering 20. This may be convenient in some applications for reasons of safety. In other applications, there may, instead, be used other connection architectures, for example a bus architecture or else a star architecture (substantially as in FIGS. 7-9), in order to guarantee operation of the covering also in the case of removal of one or more modules provided with electrical connector means.

Figure 11:
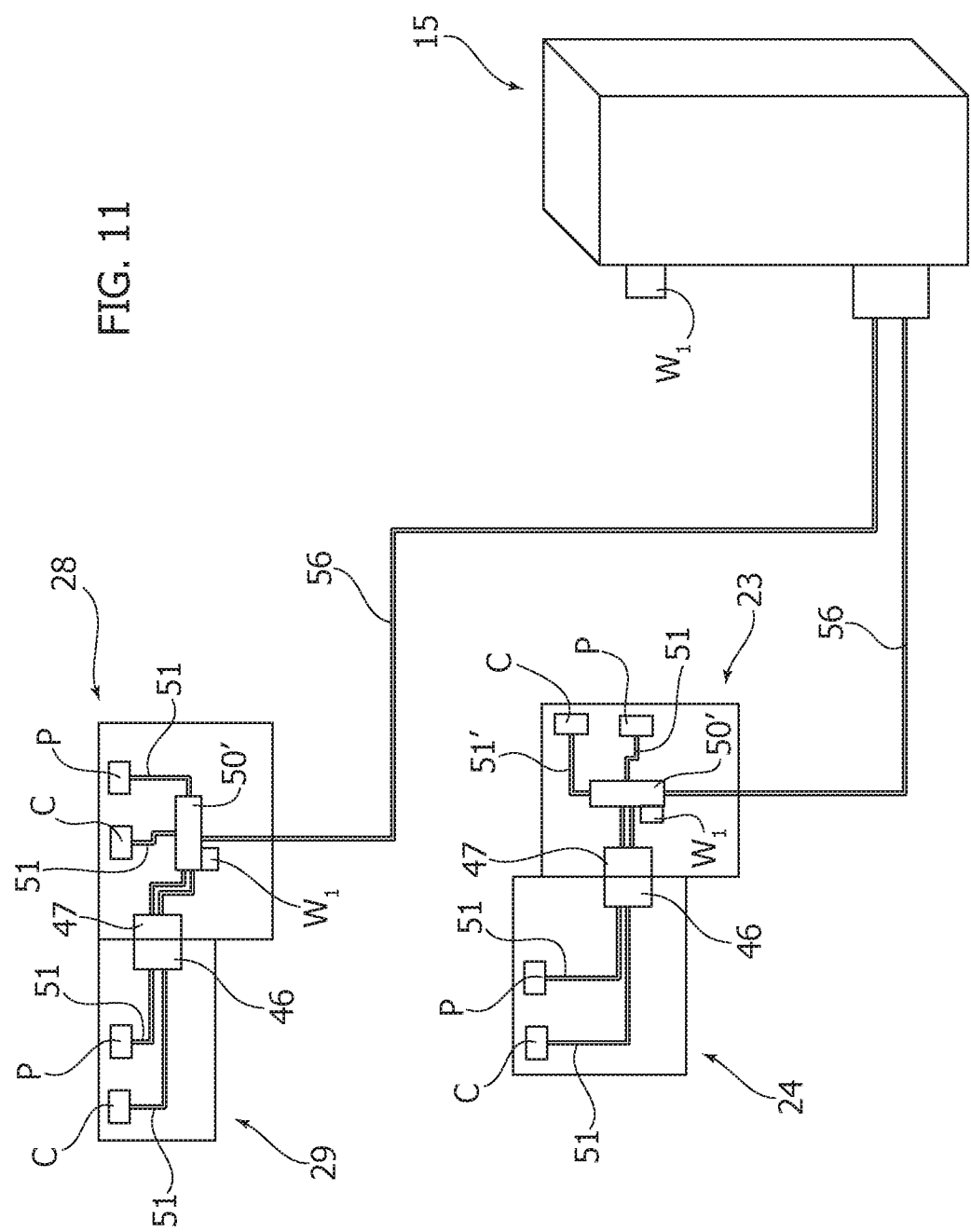

Exemplified in FIG. 11 is a case similar to that of FIG. 10, i.e., of control boards 50' configured for managing the signals of the sensor means C and/or P corresponding to a number of modules that are different but are interconnected via the electrical connector means 46 and 47. These boards 50' are additionally equipped with a wireless communication module, designated by W1, for transmission in radiofrequency at least of the signals corresponding to the detections made by the sensor means connected. For this purpose, the control unit 15 is equipped with a corresponding wireless communication module W2.

For the purposes of wireless data transmission the standard of communication deemed most convenient for the application (WiFi, Bluetooth, ZigBee, etc.) may be used. Likewise, data transmission may take place according to a suitable standard or proprietary protocol. The sets of wiring 56 between the control unit 15 and the modules 23, 28' will be used for electrical supply of the control boards 50' with the associated communication modules W1, which may, if necessary, also be of a type that is able to manage a bi-directional communication.

Obviously, implementation of wireless data communication may be applied also to the cases exemplified in FIGS. 7 and 8, in which case the sets of wiring 53 and 54 may include only conductors for electrical supply of the boards 50.

The concepts previously set forth above as regards construction, operation, and connection of modules of a sensorized covering are applicable to automated devices having one or more movable parts that may even be different from a manipulator of an industrial robot.

For instance, a sensorized covering of the type described above—albeit obtained with modules having shapes different from the ones represented in FIGS. 2-5—may advantageously be used for partial covering of robot tools or end effectors. Such a case is exemplified in FIG. 12, where designated as a whole by 100 is a gripper tool, the load-bearing structure 101 of which includes an attachment part prearranged—according to techniques in themselves known—for mechanical connection and possibly power connection (of an electrical, pneumatic, or hydraulic type) to the flange 9 of the manipulator 1 of FIGS. 1-3. Associated to the structure 101 are suitable actuator means, such as one or more pneumatic cylinders 102 that can be controlled for bringing about opening and closing of members or jaws—one of which is visible in FIG. 13 and designated by 103—for picking up a workpiece to be machined or handled.

As may be noted, in the schematic example illustrated, associated to the structure 101 are a plurality of covering modules 110, 111 and 112, 113, which provide two sensorized coverings 120 for different areas of the tool 100. In particular, the modules 110 and 111 are designed to surround an upper portion of the tool 100, closer to the portion for attachment to the flange of the manipulator, whereas the modules 112 and 113 are designed to surround a lower portion of the tool 100, movable within which are the aforesaid pick-up members 103.

Figure 13:
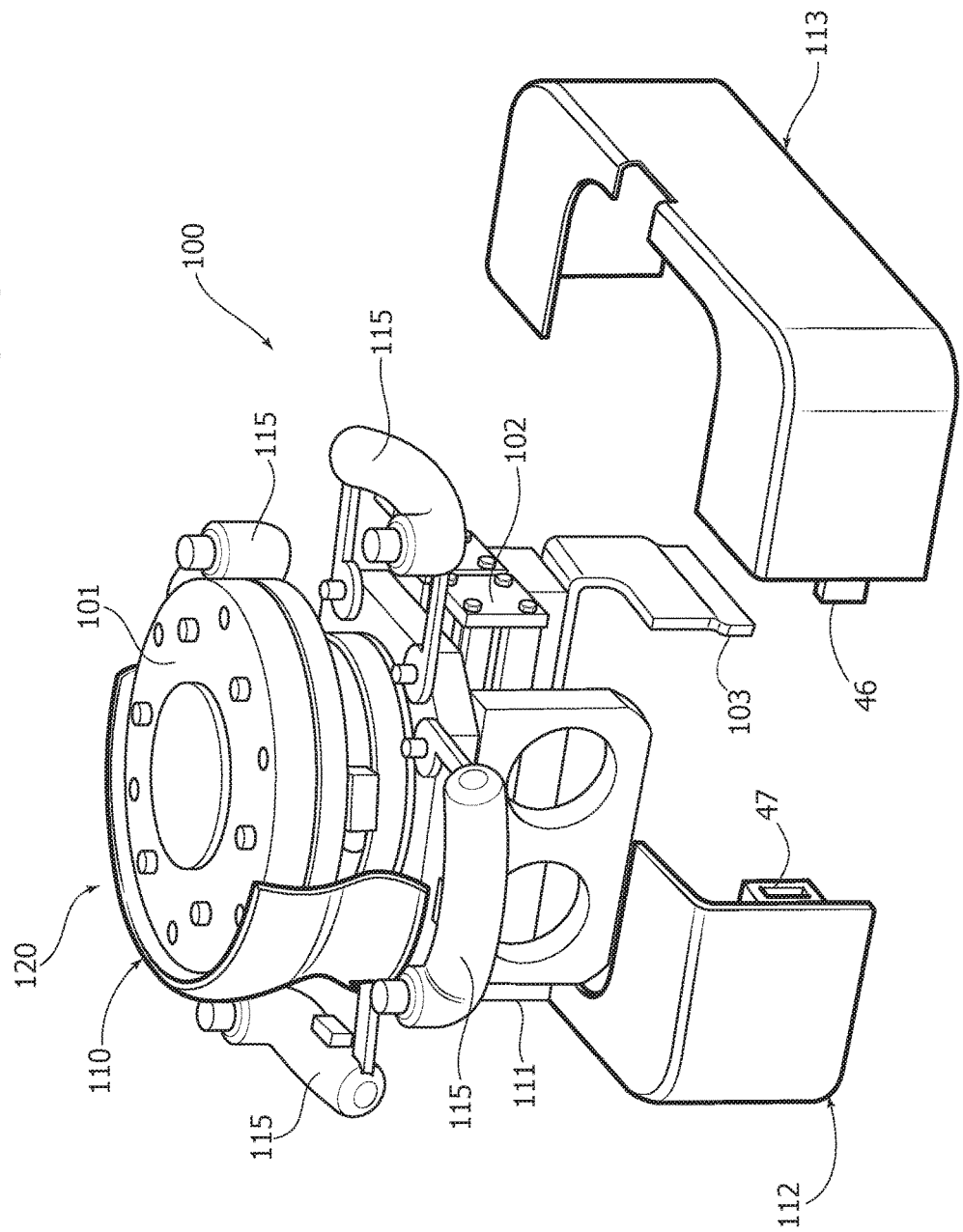
FIG. 13 is a partially exploded schematic view of the device of FIG. 12, with a covering module omitted.

In FIG. 13, the representation of the module 111 has been omitted, whilst the module 113 is represented in a condition separate from the module 112. The modules 110-111 and 112-113 are provided with the respective electrical connector means, which may be coupled together in the assembled condition of the two modules in question, there being partially visible in FIG. 13 only the connectors 46 and 47 of the modules 112-113. These electrical connector means may be configured also to fulfil the function of mechanical connection between the two modules (and this may apply, in principle, also to at least some of the modules described with reference to FIGS. 1-5). In any case, in embodiments of the type exemplified in FIGS. 13 and 14, the modules 110-111 and 112-113 may be provided with respective releasable mechanical connector means, in particular quick-coupling means, of any known conception and suitable for the given application.

In various embodiments, a robot tool or other end effector, the structure of which is covered at least in part by a sensorized covering of the type described herein, is provided for use in strict co-operation with a human operator and includes for this purpose a manual-guide device.

Figure 12:
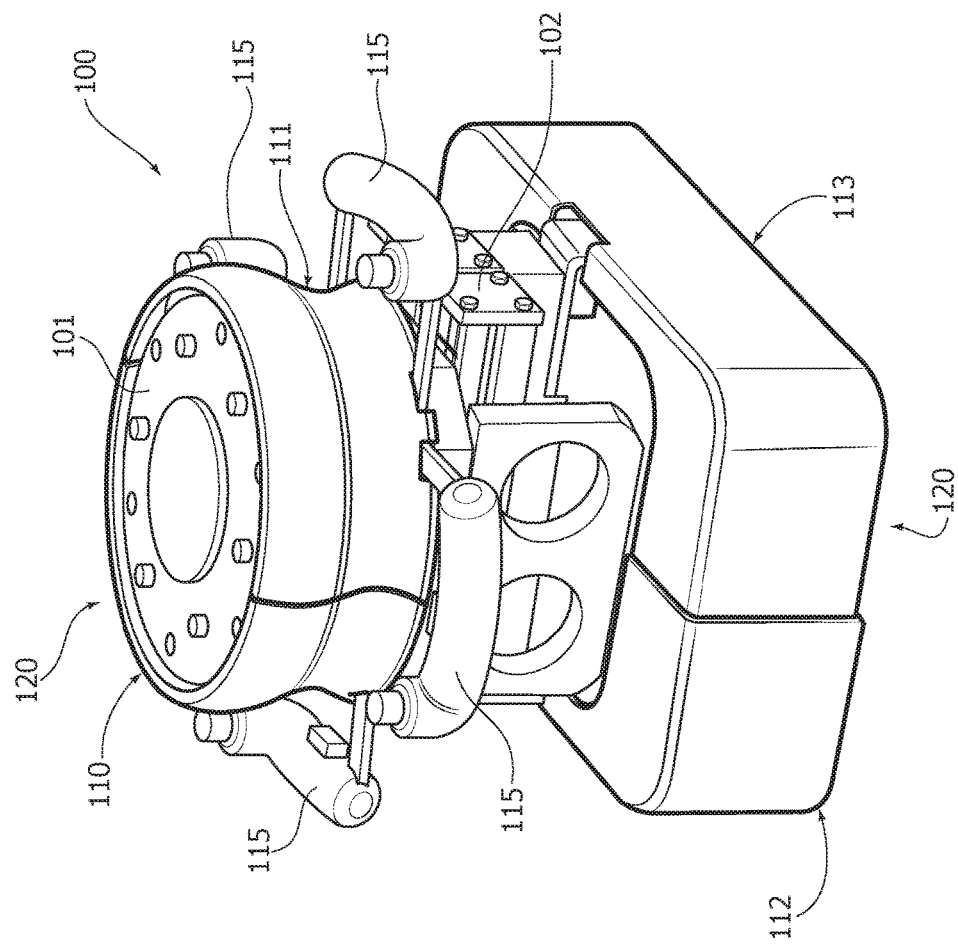
FIG. 12 is a schematic perspective view of an alternate automated device according to possible embodiments.

For instance, FIGS. 12 and 13 exemplify an embodiment in which such a guide device includes a plurality of grips 115, on each of which the operator can exert a force (thrust, pull, raising, lowering) in a certain direction to get the manipulator 1 to perform corresponding movements necessary for execution of the process. Associated to the grips 115 is a force sensor, which is connected in signal communication to the control unit 15 (in wired or wireless mode) in order to enable the latter to recognize the direction of displacement desired by the operator. Preferentially associated to each grip 115 is a corresponding push-button for control of switching of the pick-up elements 103 between the respective opening and closing positions.

In the case exemplified, four grips 115 are provided at four different sides of the tool 100 in order to enable the human operator to choose each time the grip deemed most convenient for carrying out an operation to be executed in co-operation with the robot.

Figure 14:
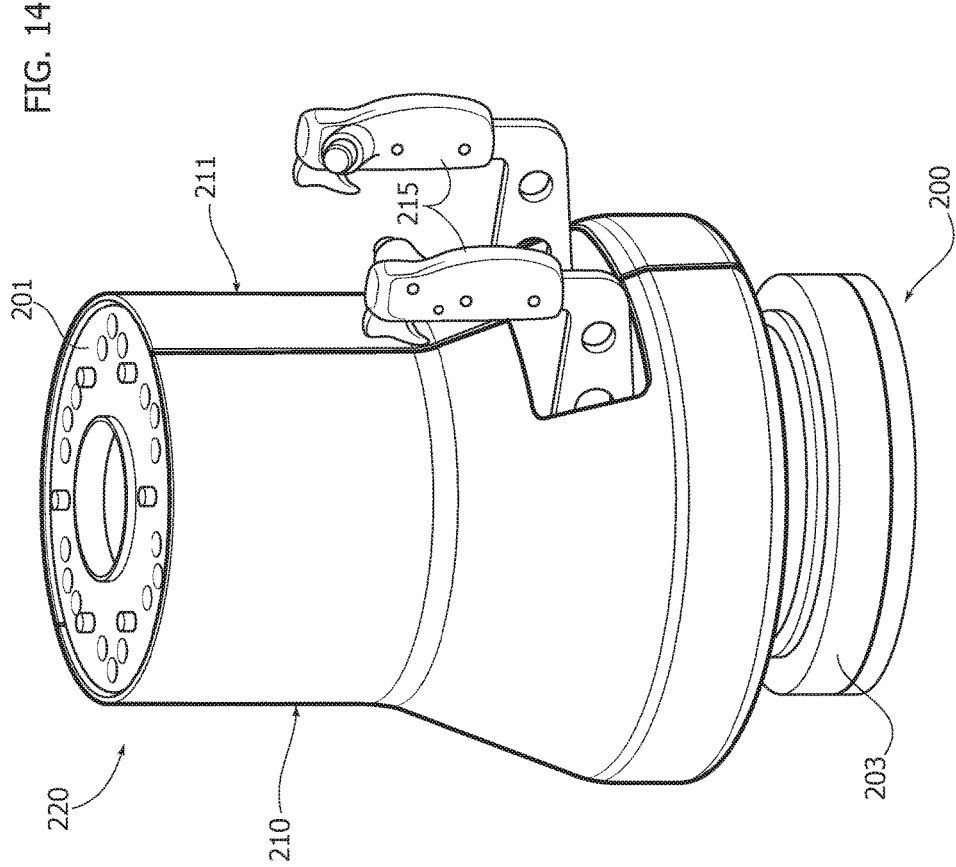
FIG. 14 is a schematic perspective view of an alternate automated device according to possible embodiments of the invention.
Figure 15:
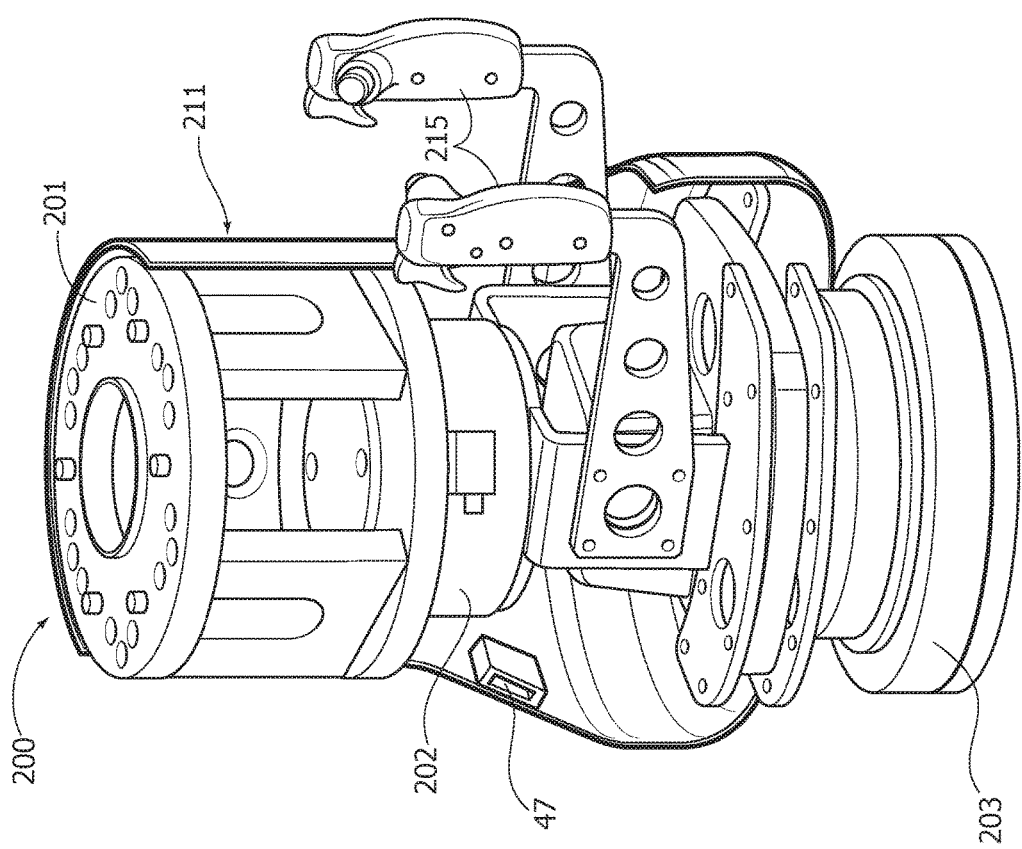
FIG. 15 is a schematic perspective view of the device of FIG. 14, with a covering module omitted.

Exemplified in FIGS. 14 and 15 is a different tool or end effector, designated as a whole by 200, in particular a grinding or polishing tool. Also in this case, the load-bearing structure 201 of the tool 200 includes an attachment part prearranged for connection to the flange 9 of the manipulator 1 of FIGS. 1-3. Associated to the structure 201 are suitable actuator means, such as an electric motor 202 that can be controlled for bringing about rotation of a disk 203 for abrading or polishing a workpiece being machined.

In the schematic example illustrated in FIG. 14, associated to the structure 201 are two covering modules 210, 211 aimed at providing a sensorized covering 220 that prevalently surrounds the structure 201, leaving the machining disk 203 exposed. In FIG. 15—where representation of the module 210 has been omitted—it may be appreciated how, also in this case, the modules 210-211 are provided with the respective electrical connector means (here only the connector 47 associated to the load-bearing structure of the module 211 is visible), which may be coupled together in the assembled condition of the two modules in question. For the rest, there apply the considerations already set forth in relation to the tool 100 of FIGS. 12-13.

In the case exemplified, also the tool 200 is provided with a manual-guide device, which here includes two generally parallel handles 115 associated to a force sensor in signal communication with the control unit of the robot in order to enable the operator to bring about displacements of the manipulator, and hence of the tool 200, in the desired working direction. Also in this case, the grips or handles 215 each have a corresponding push-button for control of rotation of the motor 102.

Figure 16:
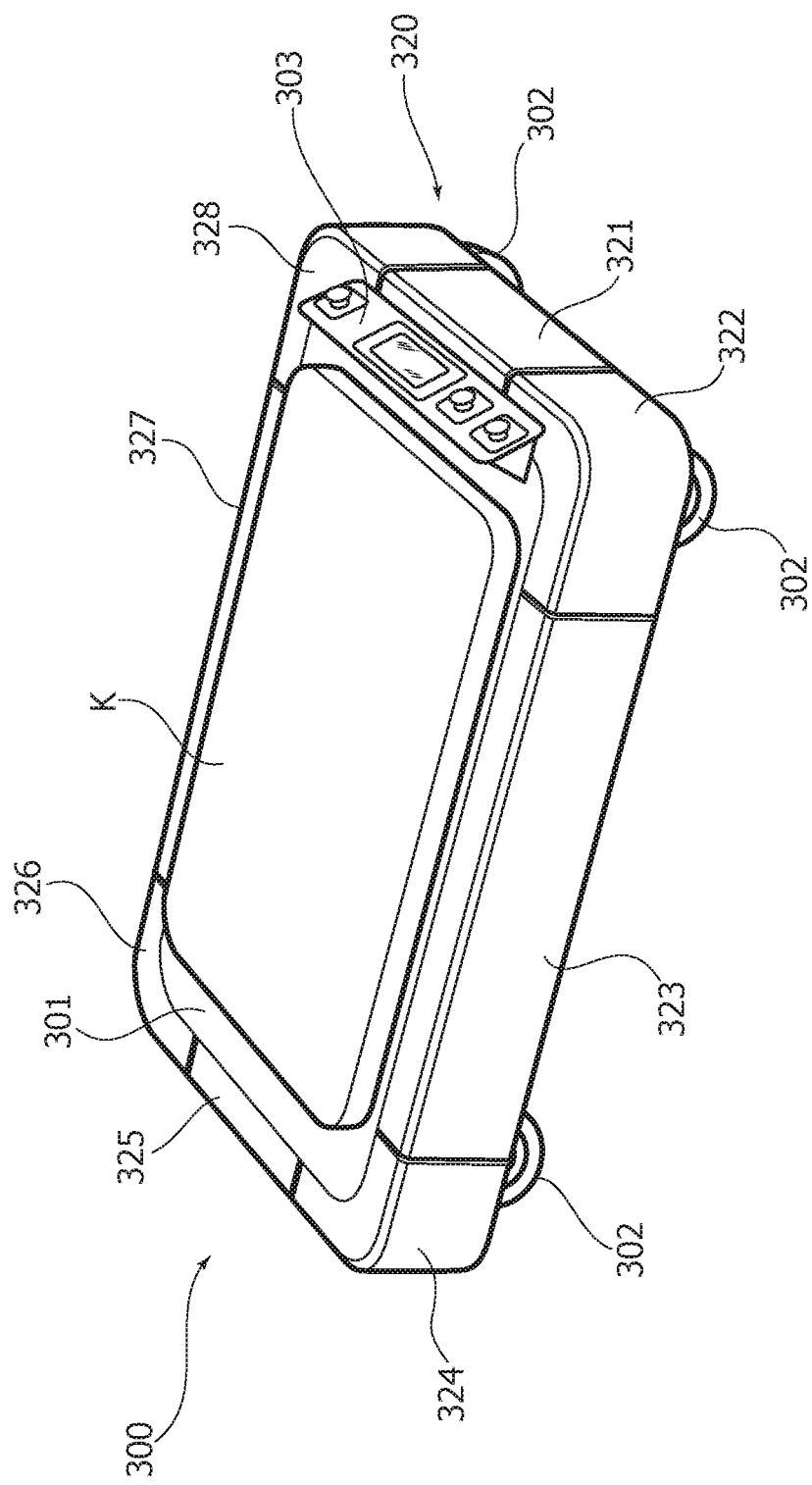
FIG. 16 is a schematic perspective view of an alternate automated device according to possible embodiments of the invention.

The sensorized covering according to the invention may also be applied to devices for movement of components being processed. An example in this sense is illustrated schematically in FIG. 16, where designated as a whole by 300 is a vehicle with automatic drive, for example of the type known as AGV (Automated Guided Vehicle), for transport of a generic workpiece K in a production framework. Associated to the load-bearing structure 301 of the vehicle 300 are wheels 302, some of which are driven in rotation via a suitable motor, preferably an electric motor (not visible). The structure 301 moreover supports a control system 303 of the vehicle, for example comprising a control unit and a user interface for setting operating parameters, according to techniques in themselves known. In conformance with the invention, the structure 301 is equipped with a sensorized covering, designated as a whole by 320, electrically connected to the aforesaid control unit. Provided in the example is a plurality of covering modules 321-328, preferably but not necessarily all sensorized, shaped so that, in their assembled condition, they surround the structure 301 substantially completely. Preferentially, the top of the structure 301 is, instead, kept exposed, in order to support thereon the workpiece K being carried. Also in this type of implementations, there apply the principles previously described, and hence, for example, provision in at least some of the modules 321-328 of contact sensor means and/or proximity sensor means, and of electrical connector means and possibly mechanical connector means, for electrical and possibly mechanical interconnection, respectively, of a number of adjacent modules, and so forth.

The modules illustrated with reference to FIGS. 12-16 may be obtained like the modules described with reference to the previous FIGS. 1-11.

The invention can of course be applied also to other types of automated devices used in industrial production and distinguished by the presence of one or more parts subject to movement in areas potentially close to a human operator, such as rotary tables and slides.

From the foregoing description the characteristics of the present invention emerge clearly, as likewise do the advantages that it affords.

The modular nature of the sensorized covering described, with the possibility of electrical interconnection and preferably also mechanical interconnection between the various modules, enables multiple configurations to be obtained, with the possibility of sensorizing substantially the entire movable structure of an automated device or else only a part thereof, according to the type of application.

The solution enables convenient installation of the covering modules, and their equally convenient removal in the case of need. To this is to be added the advantage that, in various embodiments, the modalities of electrical interconnection between the various modules enable operation thereof independently of one another.

The presence of a load-bearing structure enables definition of the shape of the individual modules according to the application, with the possibility of providing sensorized coverings for various types of automated devices. The shell-like nature of the load-bearing structures of the modules enables definition of useful spaces, which can house electrical/electronic parts of the covering system and of parts of the automated device and can moreover be exploited for ventilation purposes.

The presence of the sensor means integrated in at least some of the modules of the covering enables detection of contact of foreign bodies with, or approach thereof to, the covering itself, as well as identification of the area of the covering involved in the contact with the foreign body or in the approach of the latter, with the possibility of undertaking consequent corrective action. The sensor means, in particular the contact sensor means, may be exploited to advantage for supplying commands to the control system that supervises operation of the automated device.

Also the passive safety functions are ensured thanks to the presence of elastically yielding layers, which are thus able to absorb impact, as well as by the capacity of collapse of the load-bearing structures of the modules in the case of significant impact.

It is clear that, numerous variations may be made by a person skilled in the art to the sensorized covering and to the automated device described by way of example, without thereby departing from the scope of the invention as defined by the ensuing claims.

The invention may be applied on industrial robots of different size and loads and hence both robots for modest loads (e.g., just a few kilograms) and robots for high loads (e.g., hundreds of kilograms), as well as on robots of a type different from the anthropomorphic ones exemplified herein, for instance robots having a cartesian configuration, a cylindrical configuration, a polar configuration, a SCARA (Selective Compliance Assembly Robot Arm) configuration, etc.

The various passive layers referred to previously, for example the cushioning layer 60, may in turn be constituted by a number of layers of material set on top of one another and rendered fixed with respect to one another, for example via gluing.

What is claimed is:

1. An automated device comprising:
a movable structure;
an actuator for causing displacements of the movable structure;
a control system including a control unit and operable to control the actuator;
a sensorized covering for covering at least part of the movable structure,
wherein the sensorized covering comprises at least one of a contact sensor or a proximity sensor,
wherein the sensorized covering further comprises a plurality of covering modules mutually couplable in a separable way, each covering module of the plurality of covering modules including a respective load-bearing structure having a predefined shape to which at least one layer of elastically yielding material is connected, wherein at least two of said plurality of covering modules each having connected thereto at least one of:
an electrical connector operable to electrically interconnect in a separable way the at least two covering modules to each other, or
a mechanical connector operable to mechanically interconnect in a separable way the at least two covering modules positioned adjacent to each other.

2. The automated device of claim 1 wherein the automated device is a robot.

3. The automated device according to claim 1, wherein said at least one of an electrical connector or a mechanical connector is connected to the load-bearing structure of the at least two covering modules.

4. The automated device according to claim 3, wherein the at least two covering modules further comprise a first covering module having at least one surface or wall facing a surface or wall of an adjacent second covering module, to said surface or wall of the first covering module there being connected at least one of a first electrical connector or a first mechanical connector, and to the surface or wall of the second covering module there being connected at least one of a second electrical connector or a second mechanical connector, said at least one of said second electrical connector or second mechanical connector being complementary to said at least one first electrical connector or first mechanical connector.

5. The automated device according to claim 4, wherein the first covering module at least one surface or wall includes the first electrical connector and the first mechanical connector, and the second covering module at least one surface or wall includes the respective complementary second electrical connector and the second mechanical connector.

6. The automated device of claim 3, wherein the load-bearing structure of the at least two covering modules has at least one said electrical connector and at least one said mechanical connector connected thereto.

7. The automated device according to claim 1, wherein the plurality of covering modules further comprises a plurality of first covering modules connected in signal communication with the control unit and configured for supplying signals or data representing detections carried out via said at least one contact sensor or proximity sensor, wherein the control unit is configured for identifying a first covering module among said plurality of first covering modules that supplies said signals or data.

8. The automated device according to claim 7, comprising at least one electronic control board to which the at least one contact sensor or proximity sensor of a respective first covering module is connected, the at least one electronic control board being configured for connection in signal communication with the control unit.

9. The automated device of claim 8 wherein the at least one contact sensor or proximity sensor of at least two first covering modules are connected to the at least one electronic control board.

10. The automated device according to claim 8, wherein said at least one electronic control board is connected to an inner side of the load-bearing structure of one said plurality of first covering modules.

11. The automated device according to claim 1 wherein the at least one contact sensor or proximity sensor comprises a contact sensor, and wherein the plurality of covering modules each have a multilayered structure including a plurality of superimposed distinct layers above said load-bearing structure, the plurality of superimposed distinct layers including said at least one layer of elastically yielding material, the at least one layer of elastically yielding material further comprising:
a lower cushioning layer, made of an elastically compressible material and connected to an outer side of the load-bearing structure, the lower cushioning layer positioned below the contact sensor; and
an upper cushioning layer, made of an elastically compressible material, the upper cushioning layer positioned above the contact sensor.

12. The automated device according to claim 1, wherein the load-bearing structure is shaped substantially as a rounded or concave shell, to define a free gap between an inner side thereof and an underlying part of the movable structure.

13. The automated device according to claim 12, further comprising at least one electrical fan, said free gap forming a portion of a ventilation passage for circulation of cooling air forced by said fan.

14. The automated device according to claim 1, wherein the load-bearing structure comprises an inner side including stiffening ribs.

15. The automated device according to claim 1, wherein at least one of said contact sensor or proximity sensor further comprises an electrically conductive layer including an electrically conductive fabric.

16. The automated device according to claim 15 wherein said at least one of said contact sensor or proximity sensor comprises a contact sensor, wherein said contact sensor further comprises a first electrically conductive layer and a second electrically conductive layer each including a respective electrically conductive fabric.

17. The automated device according to claim 1 wherein the at least one of a contact sensor or a proximity sensor comprises a contact sensor and a proximity sensor, wherein the plurality of covering modules each have a multilayered structure including a plurality of superimposed distinct layers positioned above said load-bearing structure, the plurality of superimposed distinct layers further comprising:
said at least one layer of elastically yielding material further comprises an electrically insulating material connected to an outer side of the load-bearing structure;
the contact sensor positioned above said at least one layer of elastically yielding material;
an intermediate cushioning layer, comprising an electrically insulating material and positioned above said contact sensor;
the proximity sensor positioned above said intermediate cushioning layer; and
an outer coating layer positioned above the proximity sensor, the outer coating layer comprising an electrically insulating material.

18. The automated device according to claim 1, wherein the plurality of covering modules are connected in signal communication with the control unit and are configured for supplying signals or data representing detections carried out via said at least one of the contact sensor or the proximity sensor, the signals or data comprising at least one of signals or data of a respective first type, representing a contact between the sensorized covering and a foreign body, or signals or data of a second type, representing presence of a foreign body within a substantially predetermined distance from the sensorized covering,
wherein the control unit is configured for identification of a covering module among the plurality of covering modules that supplies said signals or data, and wherein the control unit is configured for adopting a control strategy of the actuator which depends upon said identification and said type or types of signals or data supplied by the identified covering module.

19. The automated device according to claim 18, wherein the control unit is operable to use the plurality of covering modules as a user interface, operable for a human operator to impart instructions to the control unit for controlling the actuator.

20. An automated robot device comprising:
a movable structure;
an actuator in communication with the movable structure, the actuator operable to selectively move portions of the movable structure;
a control unit in electronic communication with the actuator, the control unit operable to selectively send signals to actuator to selectively move the portions of the movable structure;
a sensorized covering having a first and a second covering module operable to cover at least a portion of the movable structure, each of the first and the second covering modules comprising:
 a load bearing structure;
 a cushioning layer positioned outward of the load bearing structure relative to the movable structure;
 a contact sensor positioned outward of the cushioning layer relative to the movable structure, the contact sensor operable to detect a physical impact of the sensorized covering with a foreign object and send an impact signal to the control unit;
 a proximity sensor positioned outward of the contact sensor relative to the movable structure, the proximity sensor operable to detect the presence of a foreign object within a predetermined distance from the sensorized covering and send a detection signal to the control unit;
an outer coating layer substantially covering the proximity sensor;
a peripheral wall positioned to oppose a complementary opposing wall on the first or the second covering module;
a first mechanical connector or a second mechanical connector connected to the peripheral wall, the second mechanical connector complementary to the first mechanical connector, the first and the second mechanical connectors operable to removably connect the first covering module to the second covering module.

* * * * *